(12) United States Patent
Tokutake

(10) Patent No.: US 10,437,415 B2
(45) Date of Patent: Oct. 8, 2019

(54) SYSTEM, METHOD, AND DEVICE FOR CONTROLLING A DISPLAY

(71) Applicant: Sony Mobile Communications Inc., Tokyo (JP)

(72) Inventor: Kenji Tokutake, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 66 days.

(21) Appl. No.: 14/828,734

(22) Filed: Aug. 18, 2015

(65) Prior Publication Data

US 2017/0052674 A1     Feb. 23, 2017

(51) Int. Cl.
G06F 3/0484 (2013.01)
G06F 3/0481 (2013.01)
G06F 3/042 (2006.01)
G06F 3/01 (2006.01)

(52) U.S. Cl.
CPC .......... *G06F 3/04817* (2013.01); *G06F 3/012* (2013.01); *G06F 3/014* (2013.01); *G06F 3/017* (2013.01); *G06F 3/0425* (2013.01); *G06F 3/0484* (2013.01)

(58) Field of Classification Search
CPC ...... G06F 3/04817; G06F 3/012; G06F 3/017; G06F 3/0425; G06F 3/0484
See application file for complete search history.

(56) References Cited

U.S. PATENT DOCUMENTS

| | | | | |
|---|---|---|---|---|
| 2004/0193413 | A1* | 9/2004 | Wilson | G06F 3/017 704/243 |
| 2014/0325432 | A1* | 10/2014 | Frederickson | G06F 3/0481 715/788 |
| 2015/0089445 | A1* | 3/2015 | Zotov | G06F 3/04883 715/803 |
| 2015/0145653 | A1* | 5/2015 | Katingari | G06F 1/163 340/12.3 |
| 2015/0169175 | A1* | 6/2015 | Cohen | G06F 3/04815 715/852 |
| 2016/0026358 | A1* | 1/2016 | Stewart | G06F 3/14 715/781 |
| 2016/0357358 | A1* | 12/2016 | Forster | G06F 3/0481 |

FOREIGN PATENT DOCUMENTS

JP     2014-186361     10/2014

* cited by examiner

*Primary Examiner* — Wing H Chow
(74) *Attorney, Agent, or Firm* — Xsensus LLP

(57) ABSTRACT

A device includes circuitry configured to acquire detection data from at least one sensor corresponding to a motion of a finger of a user. The circuitry is also configured to set a window based on the acquired data. The circuitry is also configured to identify a gesture based on a second motion performed by the user and to control a display based on the gesture.

18 Claims, 21 Drawing Sheets

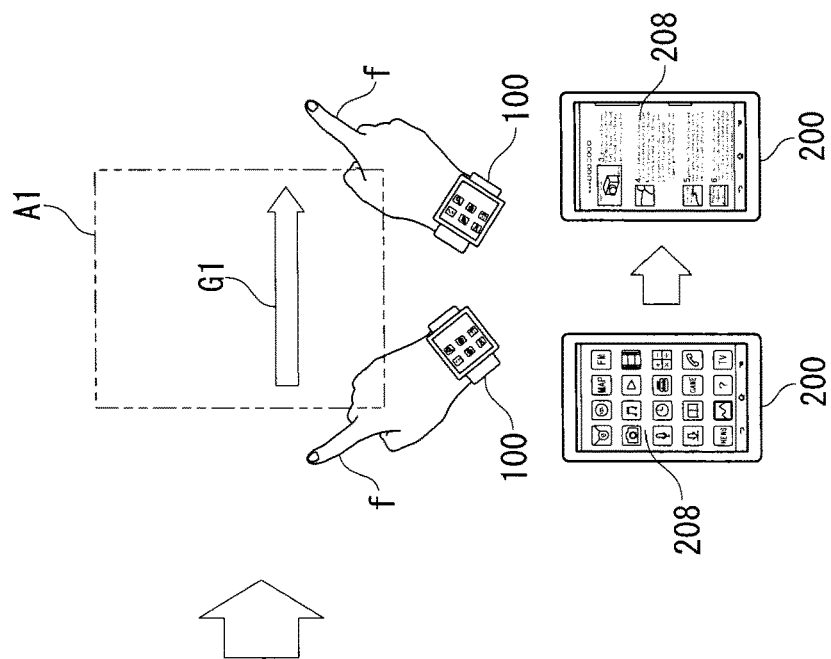
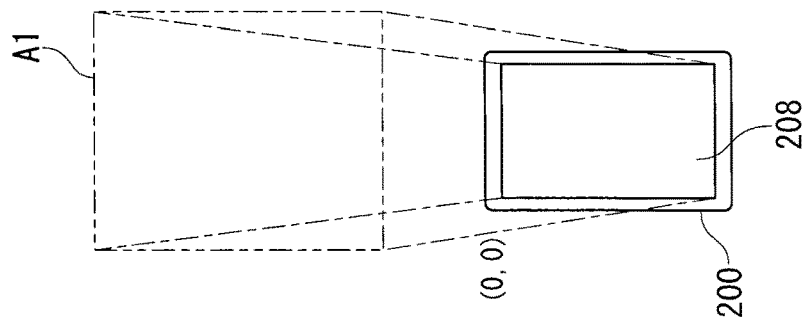
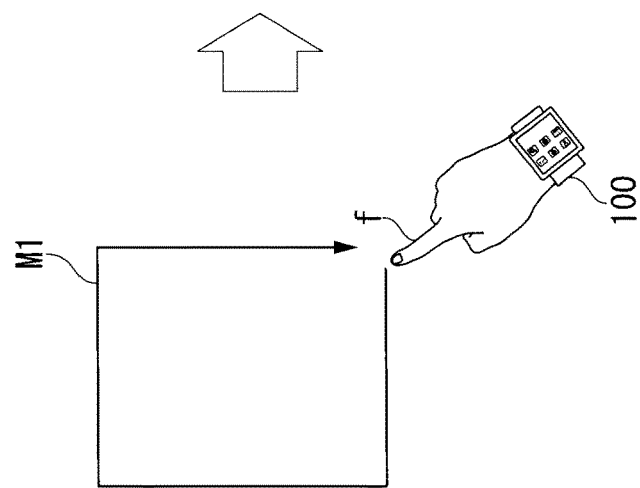
FIG. 1

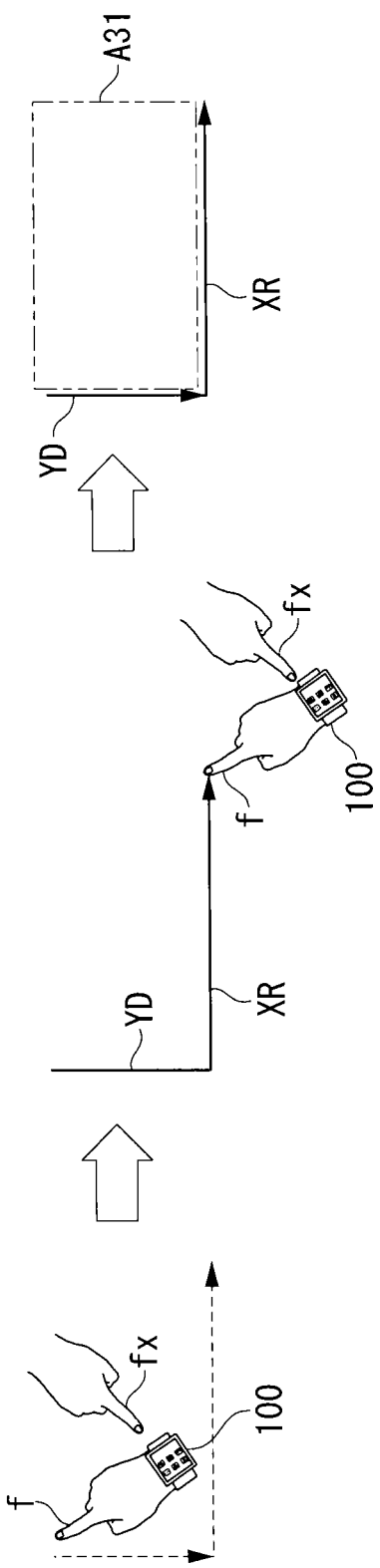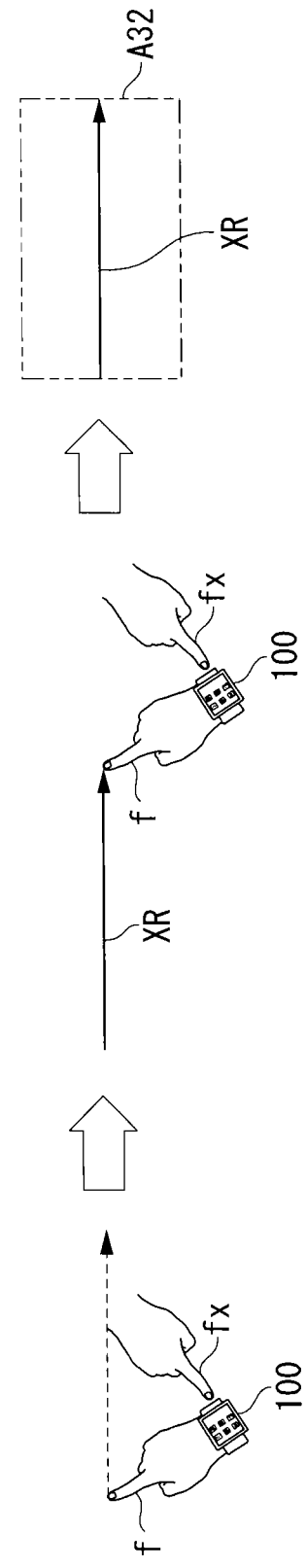
FIG. 17A
FIG. 17B

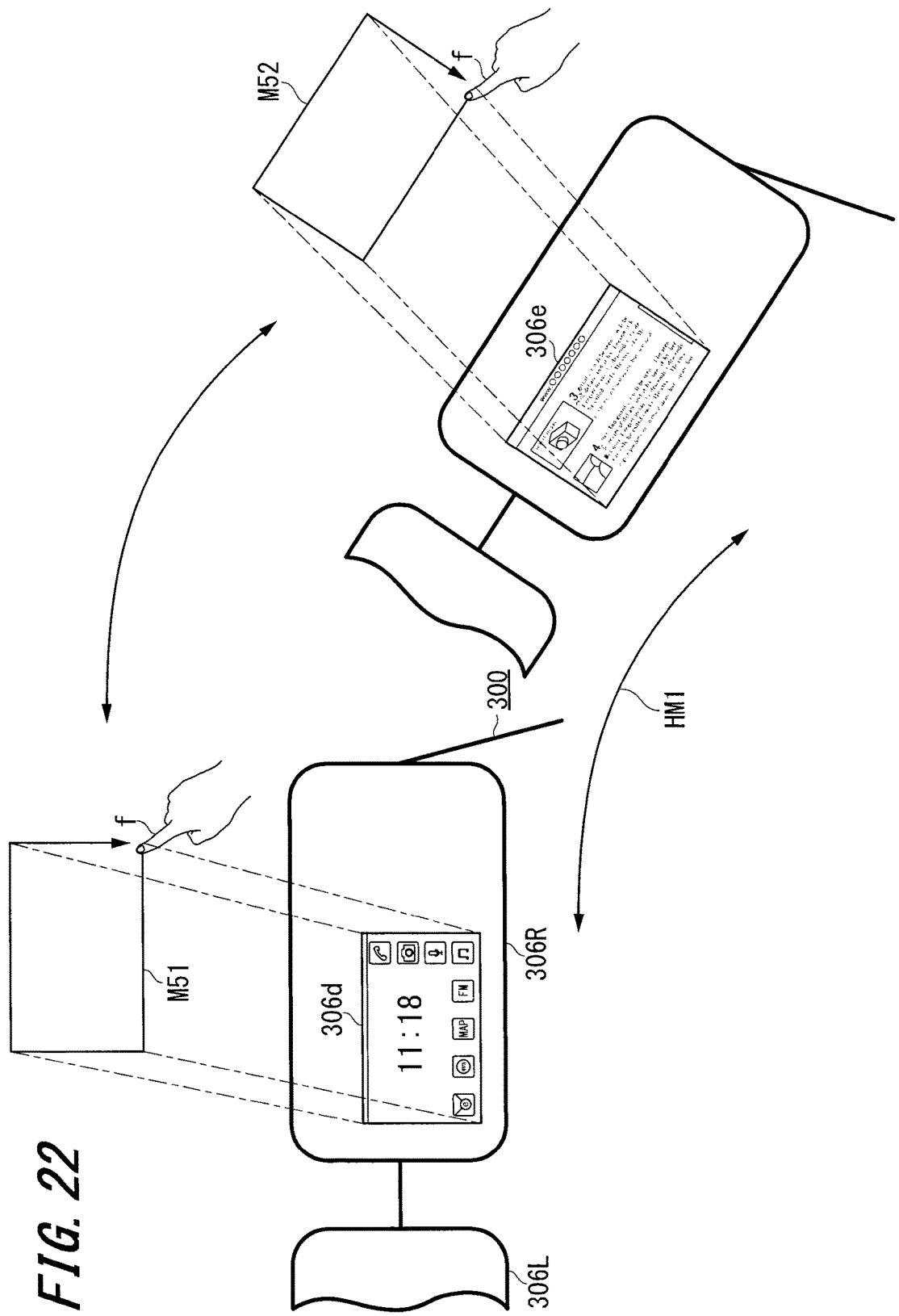

SYSTEM, METHOD, AND DEVICE FOR CONTROLLING A DISPLAY

BACKGROUND

Technical Field

The present disclosure relates to a terminal device that is worn by, or attached to, a user and a method for controlling a display using the terminal device.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Terminal devices such as smart phones and tablets often include a touchscreen. A user can perform various operations by touching the surface of a display with a finger. When the user touches the surface, various touch operations can be executed based on the movement of the finger such as sliding and tapping. When the touchscreen has a small size, the number and type of touch operations can be restricted. The size of the touchscreen of a smartwatch is very small which decrease the functionality of the touch screen. Moreover, for large size displays such as outdoors installed displays, the user may be unable to touch the surface of the display directly.

SUMMARY

A method for controlling a display includes acquiring, using processing circuitry, detection data from at least one sensor corresponding to a motion of a finger of a user in space; setting, using the processing circuitry, a window based on the detection data; identifying, using the processing circuitry, a gesture of the user based on a second motion of the finger of the user detected in the window; and outputting, using the processing circuitry, a command controlling display content based on the gesture.

A device includes circuitry configured to acquire detection data from at least one sensor corresponding to a motion of a finger of a user, set a window in a space based on the detection data, identify a gesture based on a second motion of the finger of the user in the window, and output a command controlling a display content based on the gesture.

The foregoing general description of exemplary implementations and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 1 is an exemplary illustration of the operation of a wearable device according to certain embodiments;

FIG. 17A is an exemplary illustration of setting a virtual window according to certain embodiments;

FIG. 17B is an exemplary illustration of setting a virtual window according to certain embodiments;

FIG. 22 is an exemplary illustration of setting multiple virtual windows according to certain embodiments;

DETAILED DESCRIPTION

Figure 2:
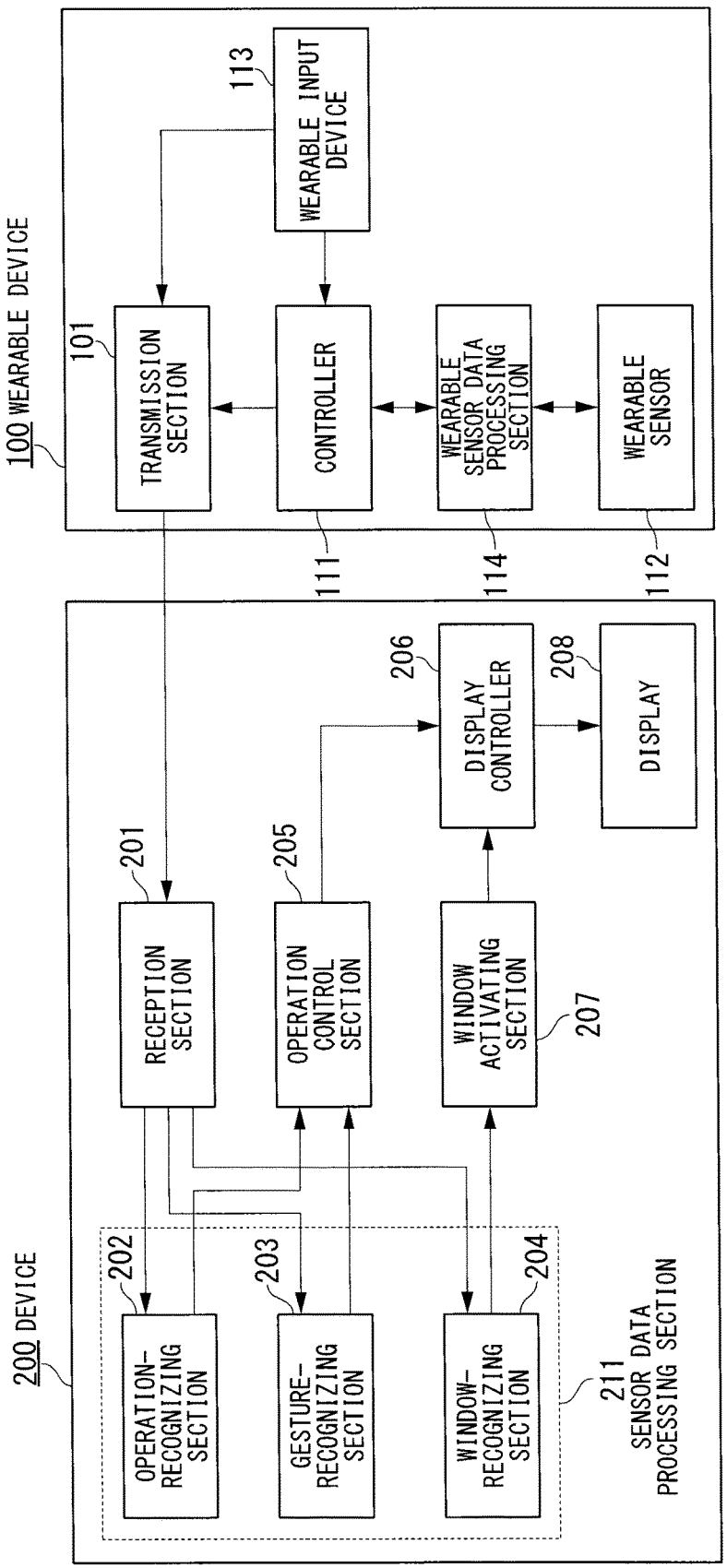
FIG. 2 is a non-limiting example of a block diagram for a wearable device and a device according to certain embodiments.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "about," and similar terms generally refer to ranges that include the identified value within a margin of 20%, 10%, or preferably 5%, and any values therebetween.

This disclosure relates to a method to control a display via a wearable device that is worn by a user. For the remainder of this description, the phrase "wearable device" is meant to describe any sort of electronic device with wireless communication capability and can detect a motion. This phrase is not meant to limit the scope of this disclosure, but is used to merely provide a more concise description.

FIG. 1 is an exemplary illustration of the operation of a wearable device 100 according to certain embodiments. The wearable device 100 includes a motion sensor. The motion sensor detects a motion of a user's arm corresponding to a motion of a finger f. When the user wearing the wearable device 100 moves the finger f in space and performs a motion M1, the wearable device 100 detects the motion M1 and sets a virtual touch operation area A1 to the coordinate position of the space on which the frame was drawn.

The wearable device 100 may communicate with a device 200. In one embodiment, the device 200 and the wearable device 100 may communicate wirelessly. The device 200 includes a display 208. The virtual touch operation area A1 operates the display 208. As an example, the wearable device 100 detects a second motion G1 which matches the movement of the finger f from left to right in the virtual touch area A1. The processing circuitry of the wearable device 100 matches the second motion G1 to a flicked action. The display 208 of the device 200 shows the flicked action.

Although the wearable device 100 is shown as a smart watch and the device 200 as a smart phone, it is understood that the wearable device may be any device configured to detect a finger motion, and the device 200 may be any device that includes a display such as a tablet, a television receiver, or a projector apparatus.

FIG. 2 illustrates a non-limiting example of a block diagram for a wearable device 100 and a device 200, according to certain embodiments. The block diagram of the wearable device 100 includes a transmission communication interface 101. The transmission communication interface 101 includes transmission circuitry such as an antenna. The transmission communication interface 101 communicates wirelessly with a reception communication interface 201 included in the device 200. The wireless communication may be Bluetooth, WiFi, near field communication (NFC) techniques or other communication techniques as would be understood by one of ordinary skill in the art. The wearable device 100 can include a wearable sensor 112. The wearable sensor 112 may include a gyro sensor, an acceleration sensor, a geomagnetic sensor or the like. The gyro sensor and the acceleration sensor can detect a motion of the wearable device 100. The geomagnetic sensor detects a direction of the wearable device. The wearable sensor 112 outputs sensor data to a wearable sensor data processing module 114. The wearable device 100 also includes a wearable input device 113 such as a touch sensor or a button. The wearable input device 113 is operated by the user.

The modules described herein may be implemented as either software and/or hardware modules and may be stored in any type of computer-readable medium or other computer storage device. For example, each of the modules described herein may be implemented in circuitry that is programmable (e.g. microprocessor-based circuits) or dedicated circuits such as application specific integrated circuits (ASICS) or field programmable gate arrays (FPGAS). In one embodiment, a central processing unit (CPU) could execute software to perform the functions attributable to each of the modules described herein. The CPU may execute software instructions written in a programming language such as Java, C, or assembly. One or more software instructions in the modules may be embedded in firmware, such as an erasable programmable read-only memory (EPROM).

The wearable sensor data processing module 114 determines the motion of the wearable device based on the sensor data received from the wearable sensor 112. The motion may include a shape, direction, and/or trajectory of movement of a finger of the user.

A controller 111 receives input from the wearable sensor data processing module 114 and the wearable input device 113. The transmission communication interface 101 receives data from the controller 111 and transmits the data to the device 200. Data received by the reception communication interface 201 is outputted to a sensor data processing module 211. The sensor data processing module 211 may include an operation recognizing module 202, a gesture recognizing module 203, and a window recognizing module 204. The operation recognizing module 202 includes processing circuitry for recognizing operations performed by the user based on the data received by the reception communication interface 201. The gesture recognizing module 203 includes processing circuitry for recognizing gestures performed by the user based on the data received by the reception communication interface 201. The window recognition module 204 includes processing circuitry for determining the window (frame) which the user indicated, based on the data received by the reception communication interface. When the window recognition module 204 recognizes a window, the position coordinates of the window are set.

The processing circuitry of the operation recognition module 202 and the gesture recognition module 203 determines operation data which are then supplied to an operation control module 205. The operation control module 205 includes processing circuitry for sending control signals based on the supplied operation data to a display controller 206. The display controller 206 includes processing circuitry for changing contents of the display 208 based on a control signal received from the operation control module 205.

Moreover, when the window recognition module 204 has recognized the window, a recognition result is sent to a window activating module 207 from the window recognition module 204. The window activating module 207 sets a window to a display screen based on the recognition result. The setting data of a window are supplied to the display controller 206. Then, the display controller 206 sets a window on the screen of the display 208 corresponding to the setting data of the window supplied.

In one embodiment, the whole screen of the display 208 may be used as a window. In other embodiments, some parts of the screen of the display 208 are used as the window.

In addition, the structure of the wearable device 100 shown in FIG. 2 and the device 200 was taken as the example to which the wearable device 100 detects a motion of a user's finger etc., and the device 200 sets a window based on the detection data.

In certain embodiments, the wearable device 100 may set a window based on the detection of a motion of a user's finger. In this case, the wearable device 100 may include a gesture recognition module and/or a window recognition module.

Figure 3:
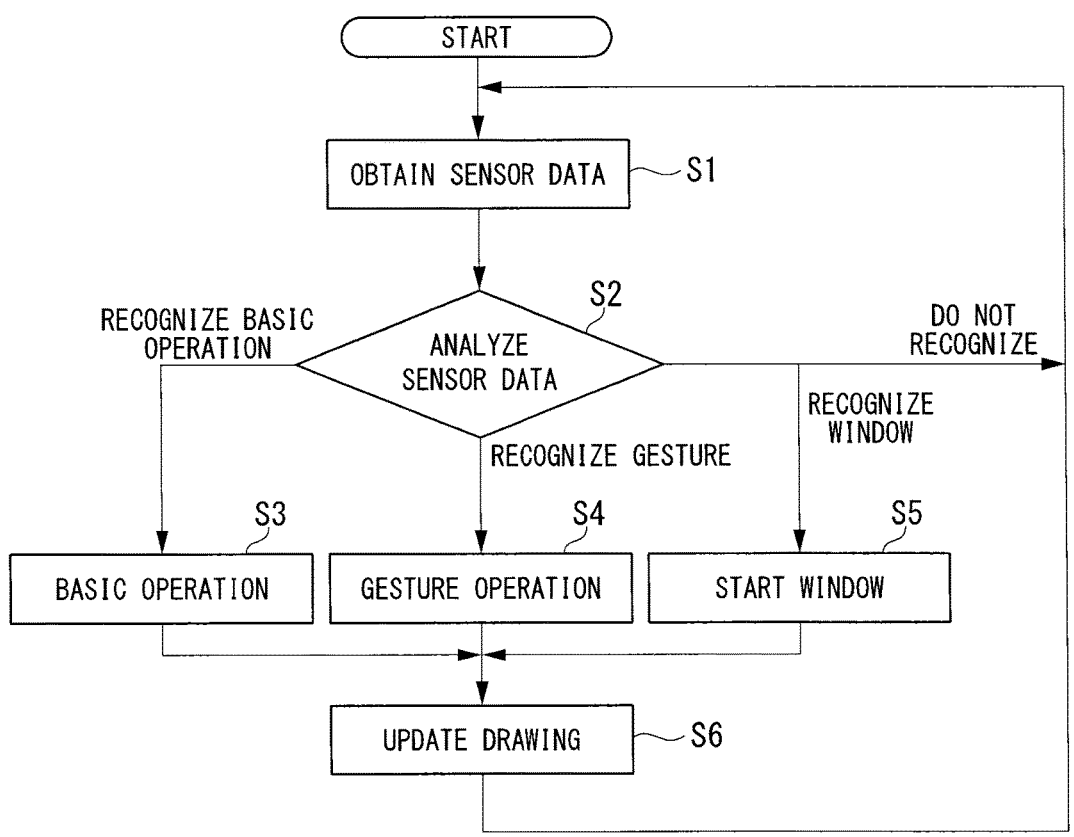
FIG. 3 is an exemplary flow chart of a process for controlling a display according to certain embodiments.

FIG. 3 is an exemplary flow chart of a process for controlling a display according to certain embodiments. At step S1, the reception communication interface 201 obtains sensor data from the wearable device 100. At step S2, the processing circuitry of the sensor-data processing module 211 analyzes the sensor data acquired at step S1 to determine a type of operation. In response to determining that the operation is a basic operation, the flow goes to step S3. At step S3, the processing circuitry of the operation-recognizing module 202 sends a signal indicating the basic operation to the operation control module 205. The basic operation may include operations such as pressing the button included in the wearable input device 113. In one embodiment, the basic operation may indicate the start and the end of the creation of the window. That is, when the user press the button, the processing circuitry recognizes that the motion performed next by the user is to create the window. When the processing circuitry determines a gesture at step S2, the gesture-recognizing module 203 sends a signal indicating the gesture to the operation control module 205 at step S4. Gestures may include tapping, flicking, tapping, pulling, scrolling, double tapping, and zooming. That is, when the user perform the gesture of tapping in space, the processing circuitry recognizes the gesture as the user is tapping on the touchscreen. When the processing circuitry determines the creation of a window at S2, the window-recognizing module 204 sends a signal indicating the creation of a window to the window activating module 207 at step S5. At step S6, the display controller updates the display based on control signals generated at step S3, S4, or S5. Then, the flow goes back to step S1. In addition, when the processing circuitry of the sensor-data processing module 211 does not recognizes an operation at step S2, the flow goes back to step S1.

Figure 4:
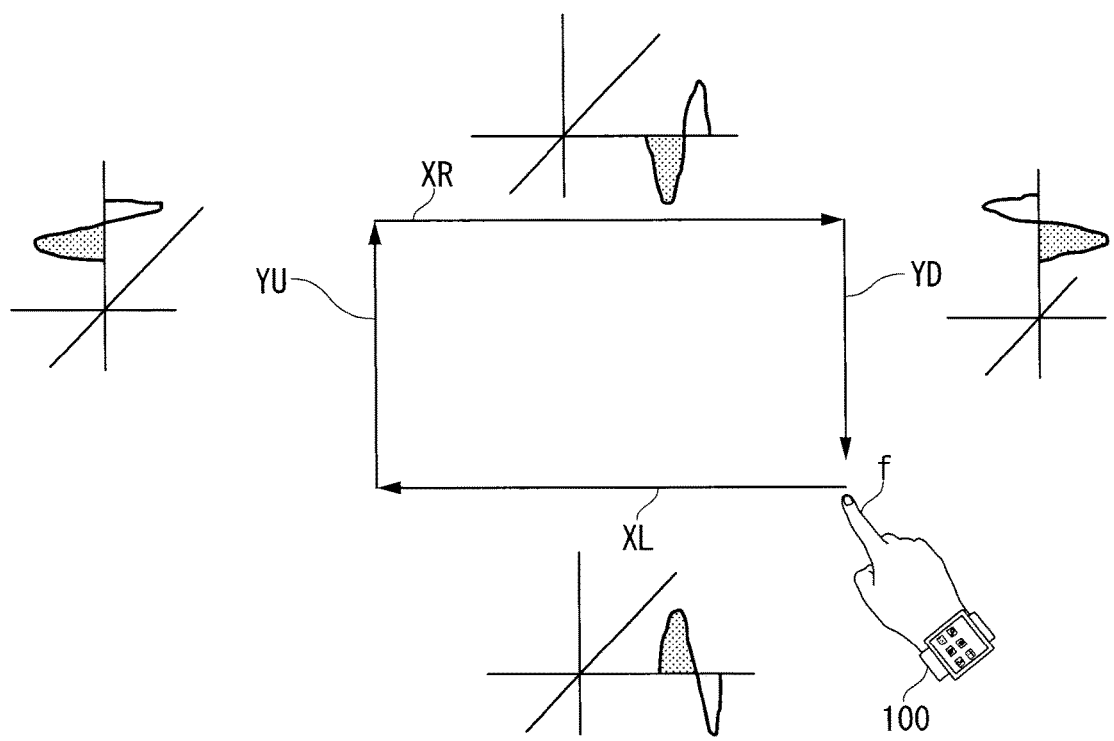
FIG. 4 is an exemplary illustration of window recognition according to certain embodiments.

FIG. 4 is an exemplary illustration of a window recognition according to certain embodiments. The wearable sensor 112 detects an acceleration added to the wearable device 100 and detects a motion of the finger f of the user using the wearable device 100. The processing circuitry of the window-recognizing module 204 carries out a double integral of the detected acceleration data to determine a distance that the finger f has moved. When the processing circuitry of the window-recognizing module 204 recognizes a window, the influence of gravity is canceled.

In certain embodiments, the X-axis is a horizontal axis and the Y-axis is a vertical axis, which are orthogonally crossed. FIG. 4 shows a motion of the finger f. The processing circuitry of the window-recognizing module 204 detects a first motion XL in the X direction going from to right to left (left of the finger f initially). Next, the processing circuitry of window-recognizing module 204 detects a second motion YU in the Y direction going from bottom to top. Furthermore, the processing circuitry of the window-recognizing module 204 detects a third motion XR from left to right in the X direction. Furthermore, the processing circuitry of the window recognition module 204 detects a fourth motion YD from top to bottom in the Y direction.

The processing circuitry of the window-recognizing module 204 determines the position coordinates of the virtual window drawn by the user. In one embodiment, the processing circuitry of the window-recognizing module 204 determines the position coordinates of the window based on the motions XL, YU, XR, and YD. In certain embodiments, the processing circuitry of the window-recognizing module 204 may recognize the motion as the window even when the user does not draw a complete rectangular shape.

Figure 5:
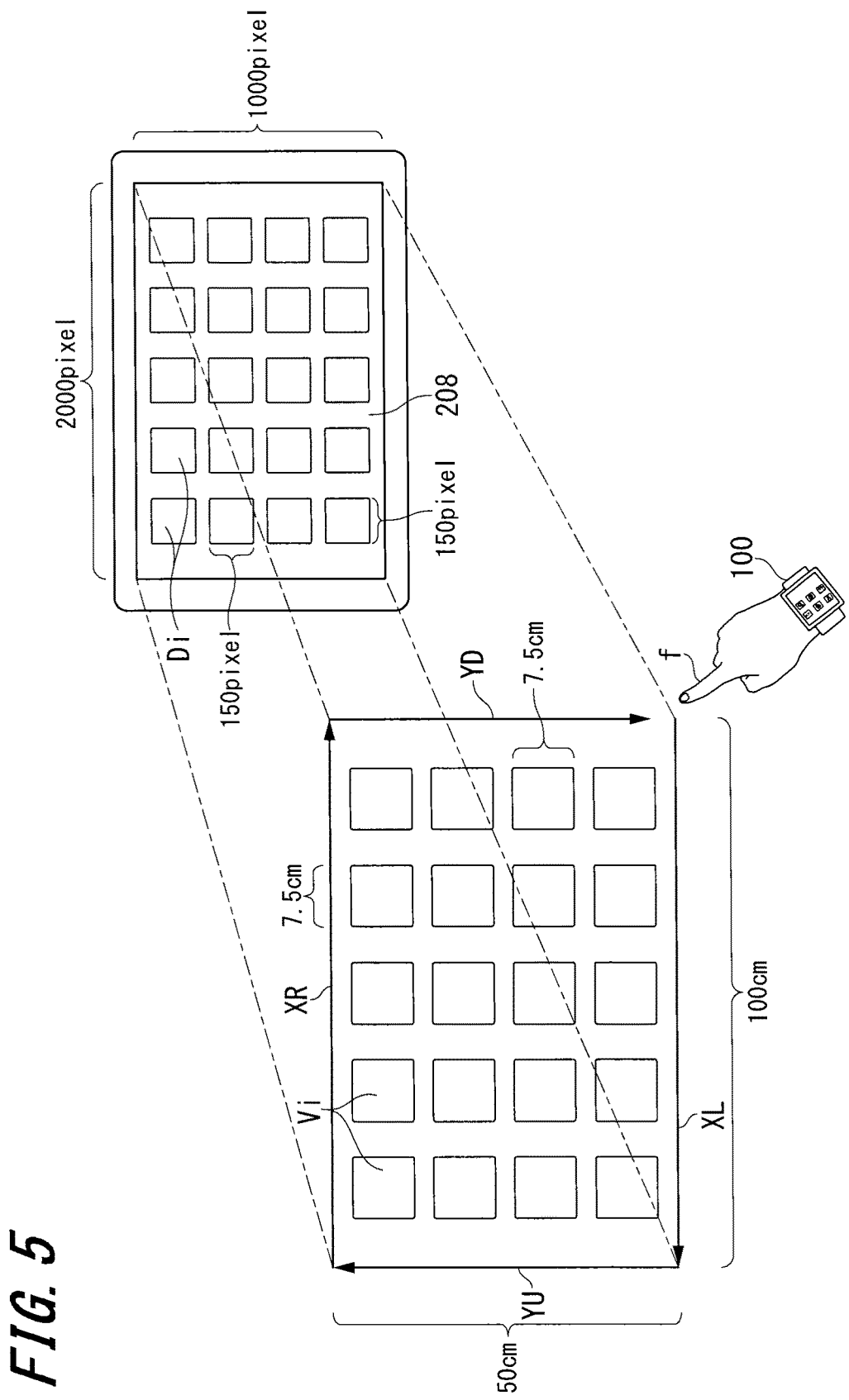
FIG. 5 is an exemplary illustration of icons in a virtual window according to certain embodiments.

FIG. 5 is an exemplary illustration of icons in a virtual window according to certain embodiments. The display 208 shows 20 icons Di. The 20 icons are disposed in a 4×5 configuration (height×width). In FIG. 5, the display 208 includes 2000 pixels in the horizontal direction and 1000 pixels in the vertical direction. The size of each virtual icon Vi is 150×150 pixels. The processing circuitry of the operation control module 205 sets each virtual icon Vi based on each icon Di inside the virtual window drawn by the motions XL, YU, XR, and YD of the finger f. For example, when the width of the virtual window is about 100 cm and the height is about 50 cm, the operation control module 205 sets the size of the virtual icon Vi to 7.5 cm×7.5 cm.

When any virtual icon Vi in the virtual window is touched with a finger, the processing circuitry of the operation control module 205 signals an icon Di corresponding to the icon selected by the touch to the display controller 206. The gesture is recognized via the methodology described in FIG. 3 at step S4. The display controller 206 changes the presentation of the selected icon Di as shown in step S6 in the methodology described in FIG. 3. For example, when the icon Di of a specific application is touched, the display 208 shifts to the presentation of the execution screen of the specific application.

Figure 6:
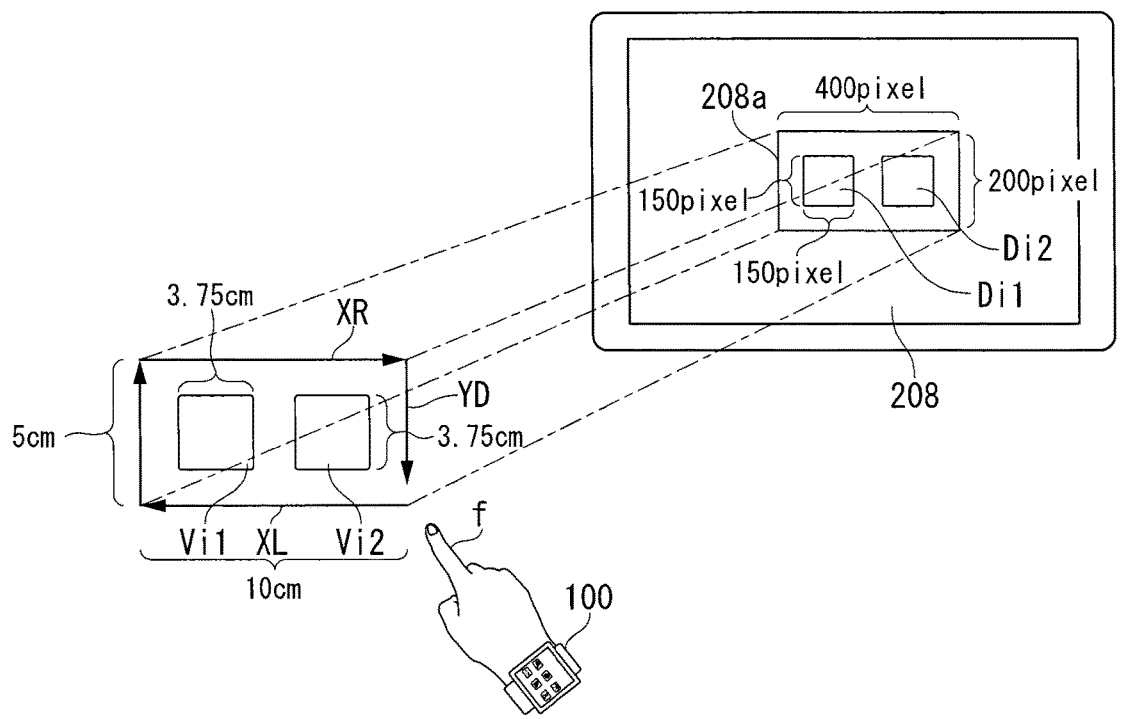
FIG. 6 is an exemplary illustration of the creation of a virtual window in one section of the screen according to certain embodiments.

FIG. 6 is an exemplary illustration of the creation of a virtual window in one section of the screen according to certain embodiments. In one embodiment, the virtual window drawn by the user may correspond to one section of the display 208. For example, the virtual window, drawn by motions XL, YU, XR, YD of the finger f, has a width of 10 cm and a height of 5 cm. The display 208 shows a first window 208*a* having a width of 400 pixels and a height of 200 pixels. Two icons Di1 and Di2 are arranged in the first window 208*a*. The size of each icon Di1 and Di2 is 150×150 pixels. Two virtual icons Vi1 and Vi2 are also set in the virtual window. When the virtual icon Vi1 is touched with a finger, the processing circuitry of the operation control module 205 selects the icon Di1 that has the same position as the virtual icon Vi1 in the display 208. The operation control module 205 changes the display 208 to display the function allocated to icon Di1.

Figure 7A:
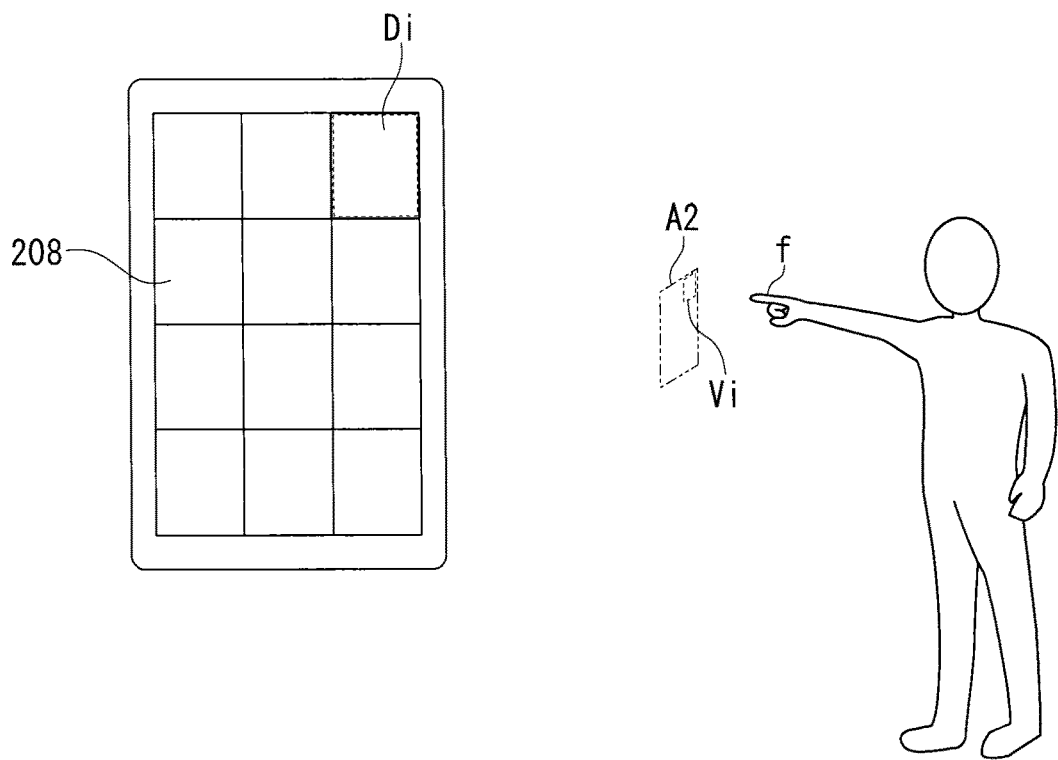
FIG. 7A is an exemplary illustration of icons visualization according to certain embodiments.

FIG. 7A is an exemplary illustration of icons visualization according to certain embodiments. In certain embodiments, the virtual window is matched with the whole screen of the display 208, even when the size of the virtual window changes. The display 208 shows 12 icons Di in a 4×3 configuration. The user may draw a small virtual window A2 with the finger f. The size of each virtual icon Vi corresponding to each icon Di is decreased.

Figure 7B:
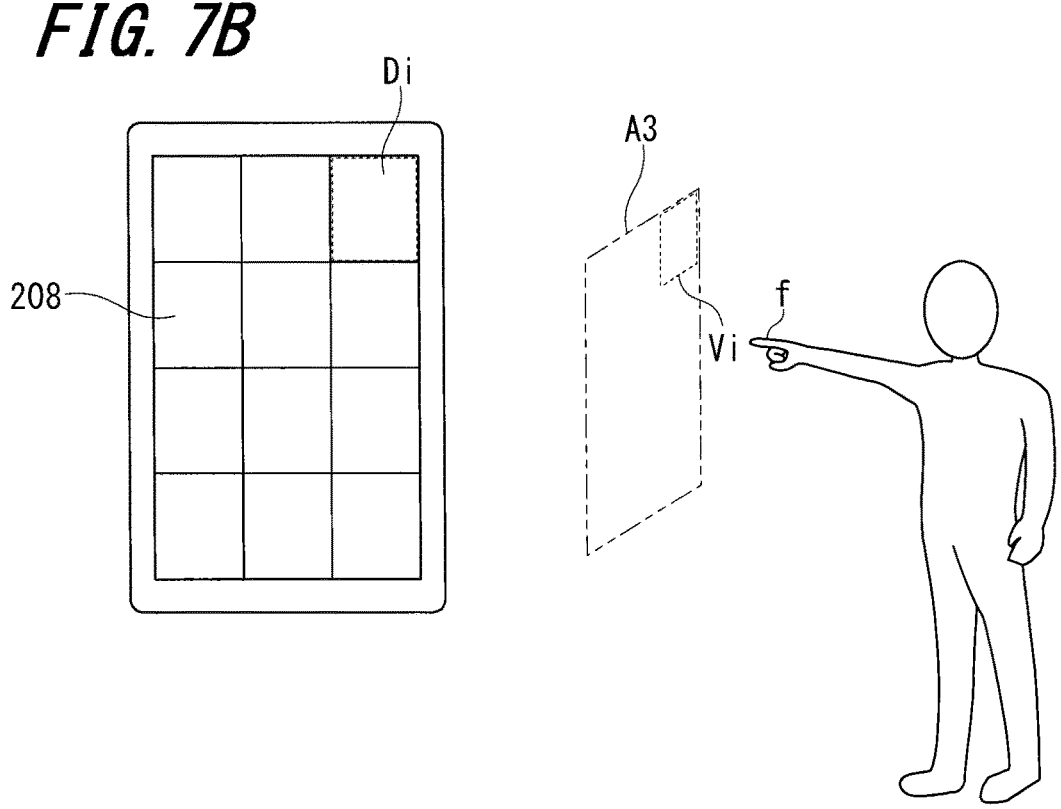
FIG. 7B is an exemplary illustration of icons visualization according to certain embodiments.

FIG. 7B is an exemplary illustration of icons visualization according to certain embodiments. In FIG. 7B, the user draws a virtual window A3 having a large size. The size of each virtual icon Vi is increased. Thus, the virtual icons sizes' vary with the size of the virtual window the user draws.

Figure 8:
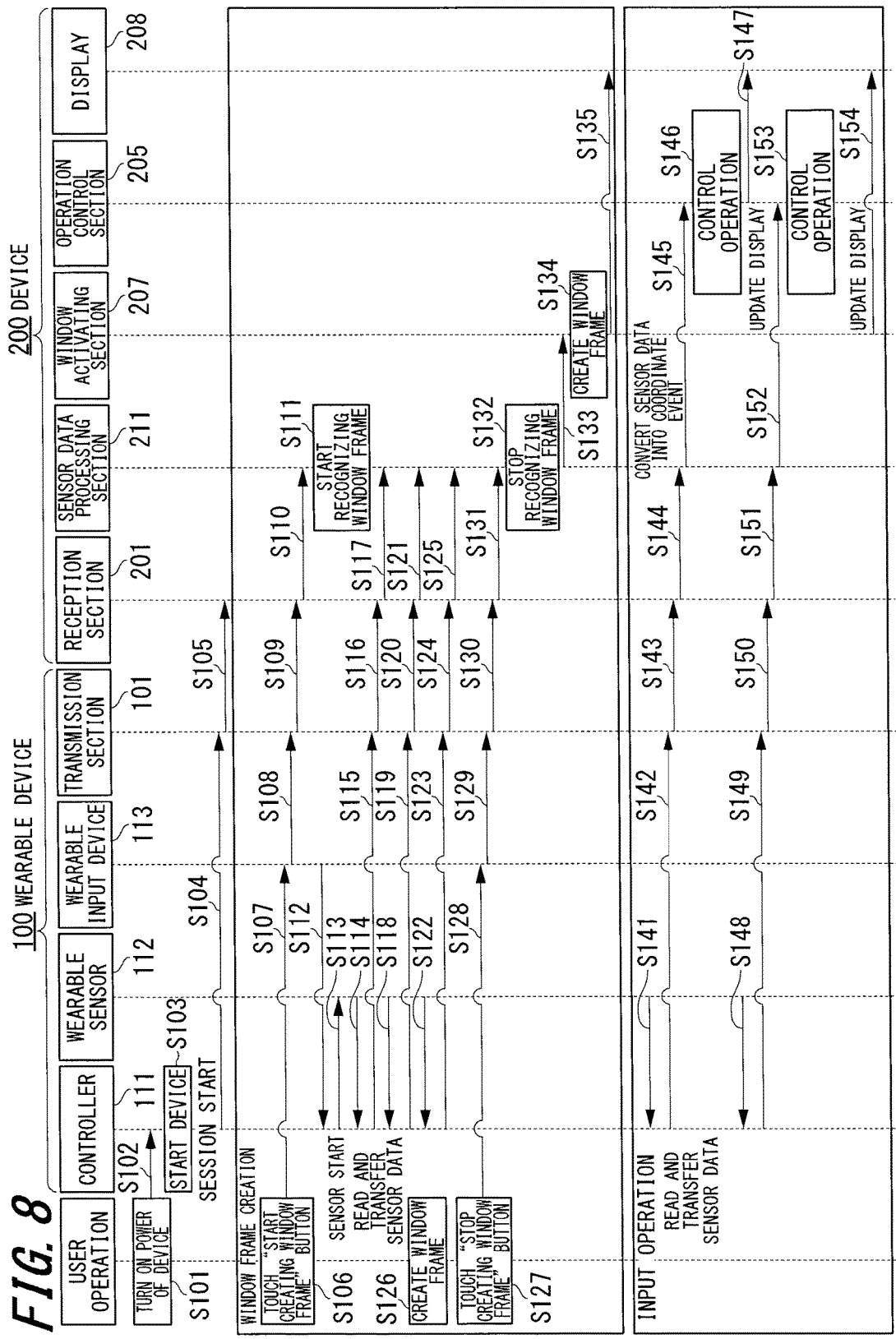
FIG. 8 is a flow chart for setting a virtual window according to certain embodiments.

FIG. 8 is a flow chart for setting a virtual window according to certain embodiments. At step S101, the user may turn ON the power supply of the wearable device 100. At step S102, a power-ON command arrives to the controller 111. At step S103, the controller 111 activates the device 200. At step S104, the controller 111 sends data to the transmission communication interface 101 indicating the start of a session. At step S105, the transmission communication interface 101 transmits data indicating the start of the session to the reception communication interface 201 of the device 200. At step S106, the user pushes the button of the wearable device 100 (or perform other operations on the touchscreen) to command the start of the creation of a virtual window. At step S107, the command to start the creation of a virtual window is detected from the wearable input device 113.

At step S108, the command to start the creation of a virtual window is sent to the transmission communication interface 101 from the wearable input device 113. At step S109, the transmission communication interface 101 transmits the command indicating the start of the creation of a new virtual window to the reception communication interface 201 of the device 200. At step S110, the command indicating the creation of a new virtual window is sent from the reception communication interface 201 to the sensor data processing module 211. At step S111, the processing circuitry of the sensor data processing module 211 starts a recognition process of a virtual window. At step S112, the wearable input device 113 sends the creation start of a virtual window to the controller 111. At step S113, the controller 111 directs a sensor output start to the wearable sensor 112. At step S114, the controller 111 starts the read-out of sensor data from the wearable sensor 112. The controller 111 reads data from a sensor used for recognition of virtual windows, such as an acceleration sensor. At step S115, the controller 111 sends the sensor data to the transmission communication interface 101. At step S116, the transmission communication interface 101 transmits the sensor data to the reception communication interface 201 of the device 200.

At step S117, the sensor data received by the reception communication interface 201 of the device 200 are transferred to the sensor-data processing module 211. The steps S114 to S117 are repeated. Steps S118 to S121 and steps S122 to S125 shown in FIG. 8 execute the same process as steps S114 to S117.

At step S126, the read-out of these sensor data is performed when the user moves his finger in space setting a virtual window. At step S127, after the motion of the finger which sets the virtual window is finished, the user may push the button of the wearable device 100 (or perform any operation on the touchscreen) to indicate the end of the creation of the virtual window.

At step S128, the direction of the end of the creation of the virtual window is detected by the wearable input device 113. At step S129, the direction of the end of the creation of the virtual window is sent to the transmission communication interface 101 from the wearable input device 113. At step S130, the transmission communication interface 101 of the wearable device 100 transmits the indication to the reception communication interface 201 of the device 200.

At step S131, the direction of the end of creation of the virtual window received by the reception communication interface 201 of the device 200 is transferred to the sensor-data processing module 211. At step S132, the sensor-data processing module 211 finishes a recognition process of a virtual window. At step S133, sensor data are sent to the window activating module 207 from the sensor-data processing module 211. At step S134, the window activating module 207 creates a virtual window based on the sensor data. The window activating module 207 determines the size of the virtual window and the position coordinates in the space where that virtual window is set. At step S135, the window activating module 207 controls the display 208 that corresponds with the created virtual window. After the creation process of the virtual window is finished, the user may perform an input operation in the created virtual window.

At step S141, the controller 111 starts the read-out of sensor data from the wearable sensor 112. The controller 111 reads the required data from a sensor in order to detect a motion of fingers, such as from the acceleration sensor. At step S142, the controller 111 sends the sensor data to the transmission communication interface 101. At step S143, the transmission communication interface 101 of the wearable device 100 transmits the sensor data to the reception communication interface 201. At step S144, the sensor data are transferred to the sensor-data processing module 211. At step S145, the sensor data are converted into a coordinate event in a virtual window in the sensor-data processing module 211. The converted data of the coordinate event are transmitted to the operation control module 205. From the data of the coordinate event in the virtual window at step S146, the operation control module 205 distinguishes a user's input operation state, and controls the operation state corresponding to the distinguished operation of the device 200.

At step S147, the operation control module 205 updates the display screen of the display 208 corresponding to the distinguished operation state. Steps S141 to S147 are repeatedly executed. Steps S148 to S154, shown in FIG. 8, perform the same process as steps S141 to S147.

Figure 9:
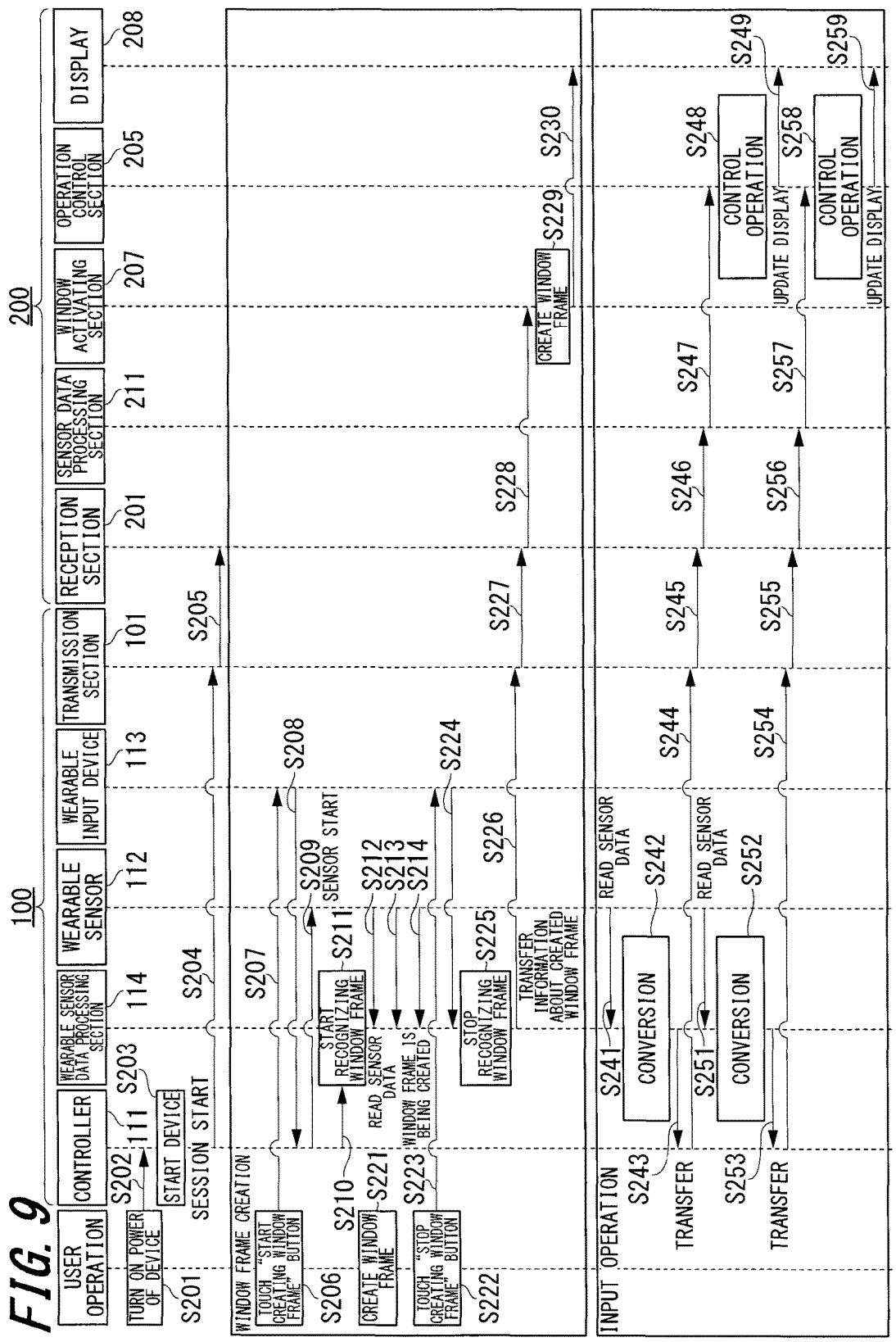
FIG. 9 is a flow chart for setting a virtual window according to certain embodiments.

FIG. 9 is a flow chart for setting a virtual window according to certain embodiments. At step S201, a user may turn ON the power supply of the wearable device 100. At step S202, a power-ON command is detected by the controller 111. At step S203, the controller 111 starts the device 200. At step S204, the controller 111 sends data to the transmission communication interface 101 indicating the start of a session. At step S205, the transmission communication interface 101 of the wearable device 100 transmits the data indicating the start of a session to the reception communication interface 201 of the device 200. At step S206, a user pushes the button of the wearable device 100 (or operation of a touchscreen) to indicate the start of the creation of a virtual window.

At step S207, the direction of the start of the creation of a virtual window is detected by the wearable input device 113. At step S208, the direction of the start of the creation of a virtual window is sent to the controller 111 from the wearable input device 113. At step S209, the controller 111 starts a read out of the sensor output of the wearable sensor 112. At step S210, the controller 111 sends an indication of activating a recognition of a virtual window to the wearable sensor-data process module 114. At step S211, the wearable sensor-data processing module 114 starts a recognition process of a virtual window. At step S212, the wearable sensor-data processing module 114 reads sensor data from the wearable sensor 112. The read-out steps S213 and S214 are repeated. At step S221, a read-out of sensor data is performed when the user performs a motion of a finger to set a virtual window in space.

At step S222, after a motion of the finger which sets a virtual window is finished, a user pushes the button of the wearable device 100 (or perform another operation on the touchscreen) that indicates the end of the creation of a virtual window. At step S223, the direction of the end of the creation of the virtual window is detected by the wearable input device 113.

At step S224, the direction to end the creation of the virtual window is sent to the wearable sensor-data processing module 114 from the wearable input device 113. At step S225, the processing circuitry of the wearable sensor data processing module 114 finishes a recognition process of a virtual window. The wearable sensor-data processing module 114 determines the size of the virtual window and sets the position coordinates of the space corresponding to the virtual window. At step S226, the data of the virtual window are sent to the transmission communication interface 101 from the wearable sensor-data processing module 114.

At step S227, the transmission communication interface 101 of the wearable device 100 transmits the data of the virtual window to the reception communication interface 201 of the device 200. At step S228, the data of the virtual window received by the reception communication interface 201 of the device 200 are sent to the window activating module 207. At step S229, the processing circuitry of the window activating module 207 sets a virtual window based on the received data of a virtual window. At step S230, the processing circuitry of the window activating module 207 controls the display 208 corresponding to the virtual window. Once the virtual window is created, the user may perform input operation in the virtual window as described herein.

At step S241, the processing circuitry of the wearable sensor-data processing module 114 starts a read-out of sensor data from the wearable sensor 112. At step S242, the wearable sensor-data processing module 114 converts the sensor data into a coordinate event of the virtual window which shows the operation state of a virtual window. At step S243, the coordinate event of the virtual window obtained by the wearable sensor-data processing module 114 is sent to the controller 111.

At step S244, the coordinate event of a virtual window is sent to the transmission communication interface 101. At step S245, the transmission communication interface 101 of the wearable device 100 transmits the data of the coordinate event of a virtual window to the reception communication interface 201 of the device 200. At step S246, the data of the coordinate event received by the reception communication interface 201 of the device 200 are transferred to the sensor-data processing module 211.

At step S247, the data of the coordinate event are transmitted to the operation control module 205 from the sensor-data processing module 211. At step S248, the processing circuitry of the operation control module 205 identifies a user's input operation state from the data of the coordinate event in a virtual window.

At step S249, the operation control module 205 updates the display screen of the display 208 based on the identified operation state. Hereinafter, the process of steps S241 to S249 is repeatedly performed. Steps S251 to S259 shown in FIG. 9 are the same as the process of steps S241 to S249.

Figure 10:
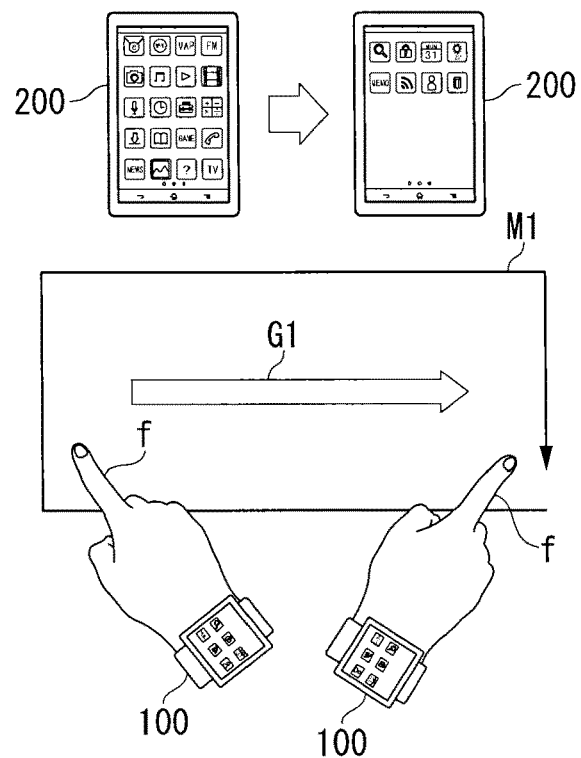
FIG. 10 is an exemplary illustration of a specific operation according to certain embodiments.

FIG. 10 is an exemplary illustration of a specific operation (flicking) according to certain embodiments. FIG. 10 shows a motion G1 from left to right of the virtual window M1 by the finger f of the user. The motion G1 causes a change in the display 208 of the device 200. The display screen of the display 208 slides to the right side and shows another display screen. The motion G1 has the same effect as touching the display 208 directly and flicking it.

Figure 11:
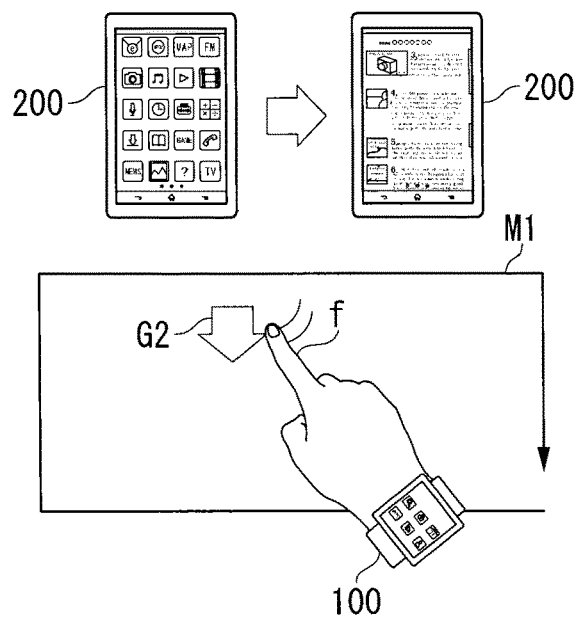
FIG. 11 is an exemplary illustration of a tapping operation according to certain embodiments.

FIG. 11 is an exemplary illustration of a tapping operation according to certain embodiments. When a motion G2 is detected, the display screen changes to another display screen. The motion G2 represents the motion from up to down of the finger f of the user in the virtual window M1. The change in the display screen is equivalent to the action caused by a user tapping directly the display 208.

Figure 12:
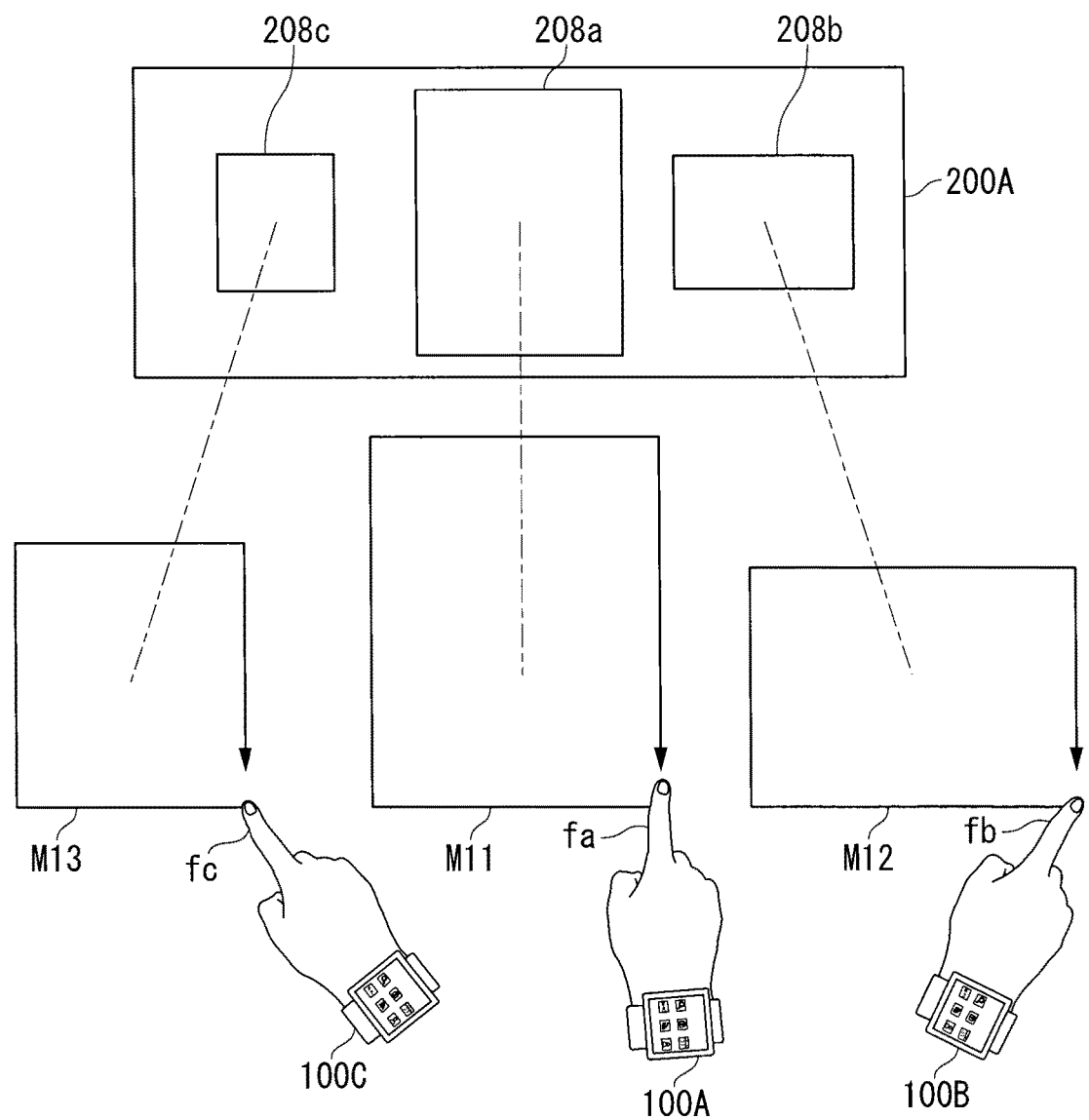
FIG. 12 is an exemplary illustration of a large size display shared by several users according to certain embodiments.

FIG. 12 is an exemplary illustration of a large size display shared by several users according to certain embodiments. A device 200A is equipped with a large size display. The large size display may be installed in a plurality of places such as a vehicle, a store, workplace, a classroom, and a public space. A first user, a second user, and a third user are using a first wearable device 100A, a second wearable device 100B, and a third wearable device 100C respectively. The first user equipped with the first wearable device 100A may set a virtual window M11 by pointing a finger fa approximately to the center of the device 200A. The second user equipped with the second wearable device 100B may set a virtual window M12 by pointing a finger fb to the right end of the device 200A. The third user equipped with the third wearable device 100C may set a virtual window M13 by pointing a finger fc to the left end of the device 200A. The screen of the device 200A shows windows 208a, 208b, and 208c corresponding to each virtual window M11, M12, and M13 respectively. The contents shown in each window 208a, 208b, and 208c change corresponding to a detected motion of fingers fa, fb, and fc by the wearable device 100A, 100B, and 100C respectively. The display screen of the three windows 208a, 208b, and 208c may be used as the execution screen of separate applications. This has the advantage to control a large size display without needing the user to touch the display directly. The user can use a virtual window and update the screen without the need to touch the display directly.

Figure 13:
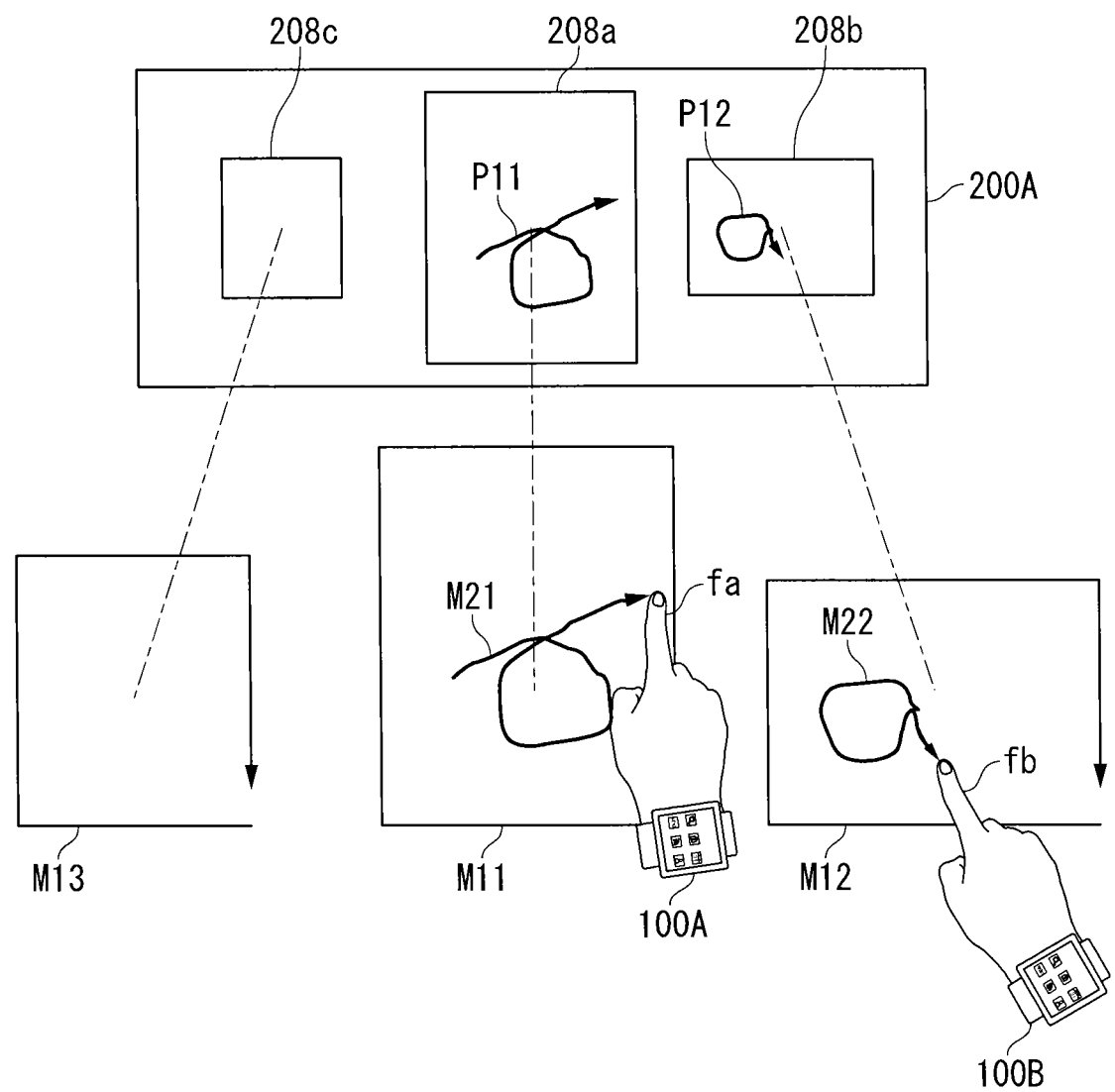
FIG. 13 is an exemplary illustration of a large size display shared by several users according to certain embodiments.

FIG. 13 is an exemplary illustration of a large display shared by several users according to certain embodiments. Each user may draw in the windows 208a, 208b, and 208c of the device 200A. For example, the first user equipped with the wearable device 100A may draw a first figure P11 by creating a motion M21 by moving finger fa in the virtual window M11. The second user equipped with the wearable device 100B may draw figure P12 in the window 208b by creating a motion M21 by moving finger fb. Thus, device 200A controls a display content separately for every window. Each window 208a, 208b, and 208c is an execution screen of an application specified by each user.

Figure 14:
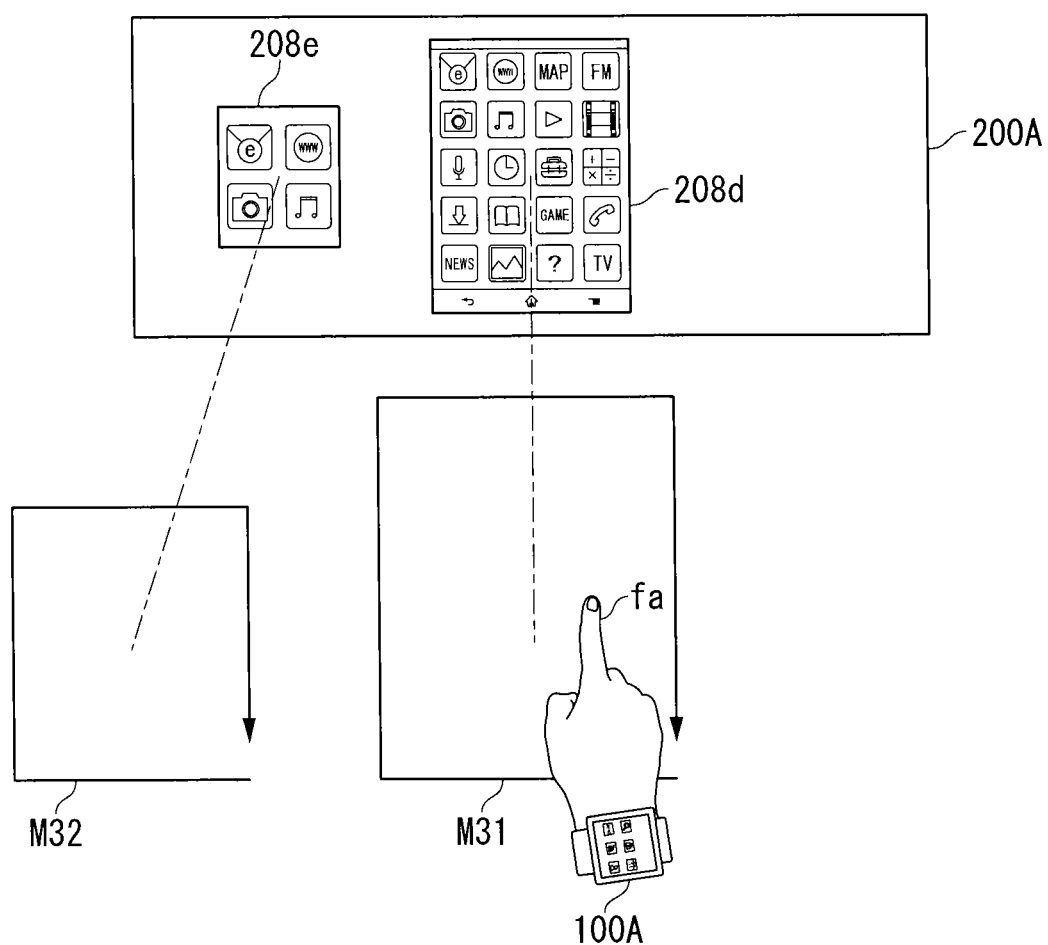
FIG. 14 is an exemplary illustration of setting virtual windows with a plurality of sizes according to certain embodiments.

FIG. 14 is an exemplary illustration of setting virtual windows of several sizes according to certain embodiments. FIG. 14 shows two windows 208d and 208e created by two users on device 200A. The windows 208d and 208e show different icons. The window 208d is set by the motion M31 created by the finger fa of the user equipped with the wearable device 100A. The window 208e is set by the motion of a user's finger not shown in FIG. 14. In this example, the window 208d is large while the window 208e is small. The number of icons that be shown in each of the window 208d and 208e is a function of the size of the window. For example, 20 icons are shown in the window 208d while only four icons are shown in the window 208e. By having the number of icons shown in each window proportional to the window size, the user can select easily an icon in the virtual window irrespective of the virtual window size.

Figure 15A:
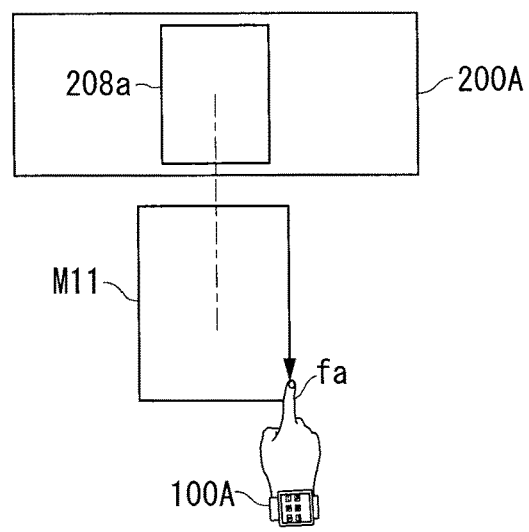
FIG. 15A is an exemplary illustration of setting a first virtual window according to certain embodiments.

FIG. 15A is an exemplary illustration of setting a first virtual window according to certain embodiments. FIG. 15A shows the initial screen. The user equipped with the wearable device 100A sets the window 208a by the motion M11. The window 208a is set in the center of the screen of the device 200A.

Figure 15B:
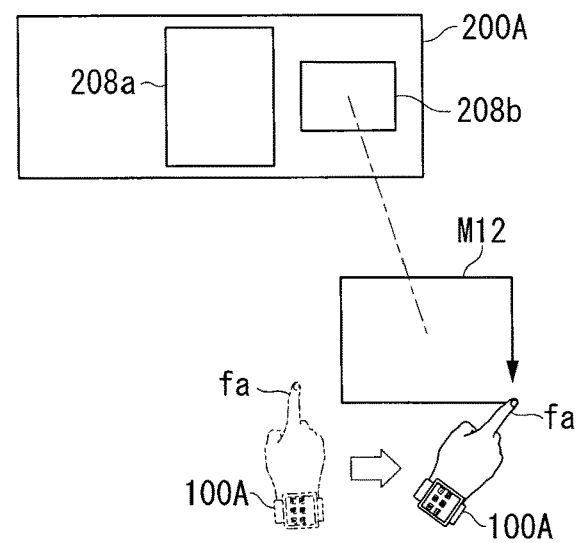
FIG. 15B is an exemplary illustration of setting a second virtual window according to certain embodiments.

FIG. 15B is an exemplary illustration of setting a second virtual window according to certain embodiments. The user may draw the window 208b on the screen of the device 200A by the motion M12 of the finger fa of the user in a space to the right end of the screen as shown in FIG. 15B. The window 208b is set to the right of window 208a.

Figure 15C:
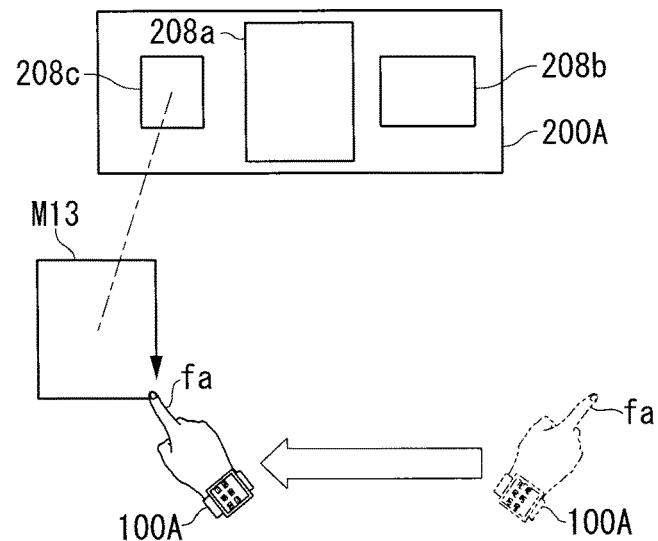
FIG. 15C is an exemplary illustration of setting a third virtual window according to certain embodiments.

FIG. 15C is an exemplary illustration of setting a third virtual window according to certain embodiments. As shown in FIG. 15C, a user sets the window 208c by the motion M13 of the finger fa of the user. The window 208c is set to the left of window 208a. Thus, in one embodiment, one user can set several windows by drawing virtual windows in space.

Figure 16A:
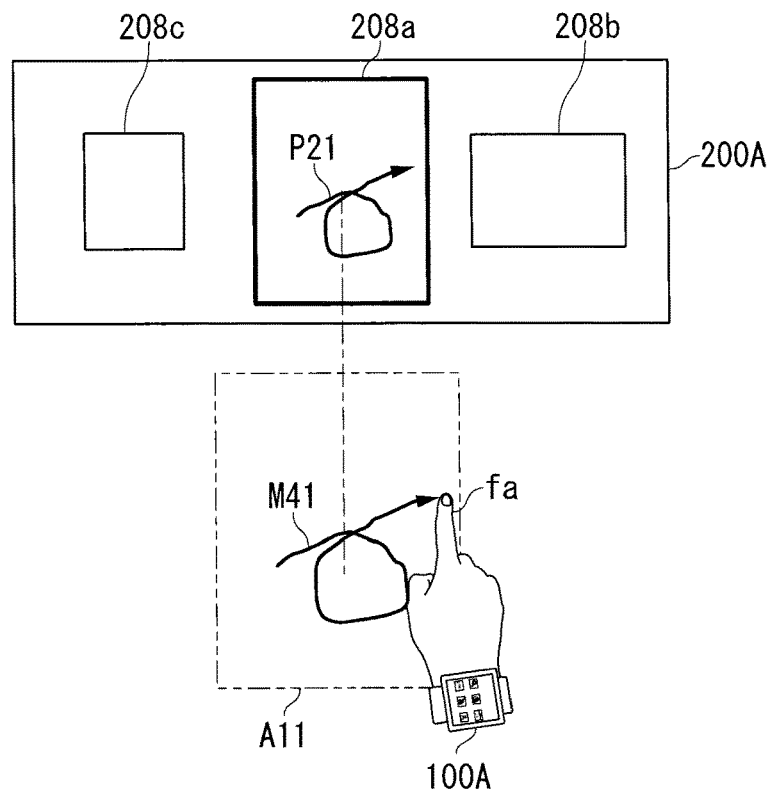
FIG. 16A is an exemplary illustration of drawing in a virtual window according to certain embodiments.

FIG. 16A is an exemplary illustration of drawing in a virtual window according to certain embodiments. A figure P21 is drawn on the window 208a as shown in FIG. 16A when the finger fa of the user is positioned at the center of the virtual window A11 and performs a motion M41. The figure P21 corresponds to the motion M41 in the virtual window A11.

Figure 16B:
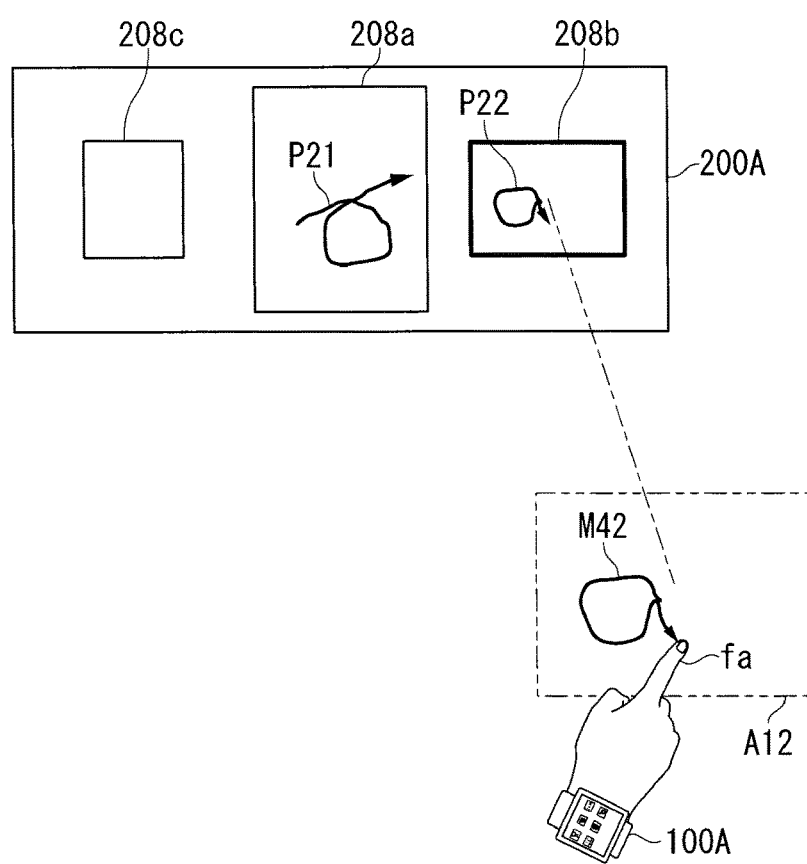
FIG. 16B is an exemplary illustration of drawing in a virtual window according to certain embodiments.

FIG. 16B is an exemplary illustration of drawing in a virtual window according to certain embodiments. FIG. 16B shows the user putting the finger fa on the coordinate position of the virtual window A12 and draws a figure P22 on the window 208b. The figure P22 is drawn on the window 208b corresponding to the motion M42 of the finger fa within the virtual window A12. Thus, the user can switch from a first window to a second window by changing the position in space where the finger fa is positioned.

FIG. 17A is an exemplary illustration of setting a virtual window according to certain embodiments. In one embodiment, the virtual window may be set by using four motions XL, YU, XR, and YD as shown in FIG. 4. In other embodiments, less than four motions may be used to set the virtual window. As shown in FIG. 17A, the user may set the virtual window A31 using two motions XR and YD. XR sets the width of the virtual window and YD sets the height of the virtual window.

FIG. 17B is an exemplary illustration of setting a virtual window according to certain embodiments. As shown in FIG. 17B, the user may set the virtual window A32 using a single motion XR in the horizontal direction. The aspect ratio of the virtual window may be predetermined. For example, the aspect ratio (width/height) may be equal to 2:1. Once the user set the width of the virtual window, the height is automatically determined as a function of the aspect ratio. In one embodiment, the user may set the height, and the width is automatically determined as a function of the aspect ratio.

Figure 18:
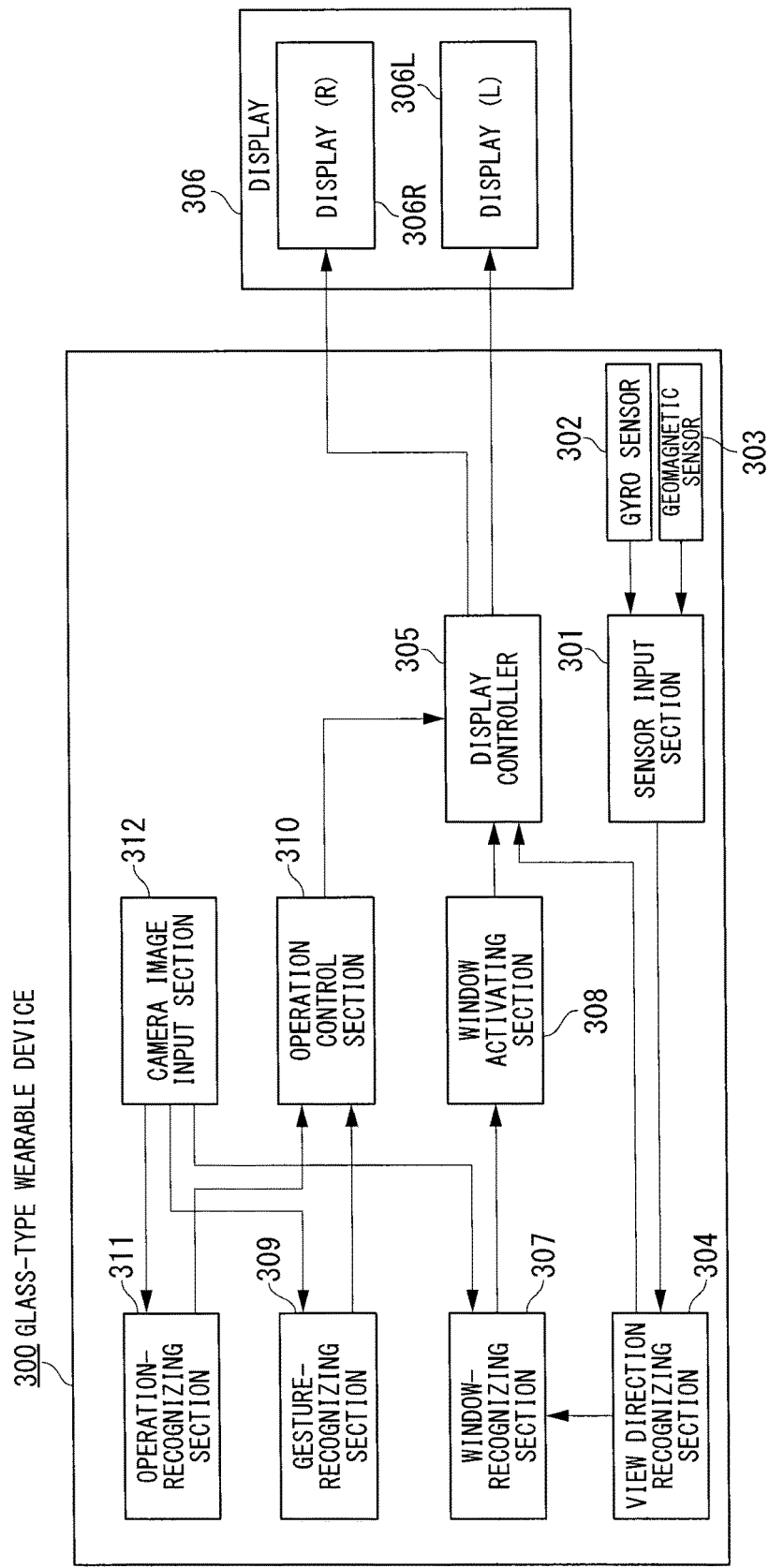
FIG. 18 is a non-limiting block diagram of a glass-type wearable device 300 according to certain embodiments.

FIG. 18 is a non-limiting block diagram of a glass-type wearable device 300 according to certain embodiments. A glass-type wearable device may include head-mounted displays and smart glasses. The user may wear a glass-type device such as spectacles. The glass-type may show an image of the screen that can be seen by the left or the right eyes or both. The glass-type device 300 may include a sensor input module 301, a gyro sensor 302, and a geomagnetic sensor 303. Detection data collected by the gyro sensor 302 and the geomagnetic sensor 303 are sent to a view direction recognizing module 304 from the sensor input module 301. The processing circuitry of the view direction recognizing module 304 determines a user's view based on the detection data. The user's view data are sent to a display controller 305. The display controller 305 controls a display 306. The display 306 may include a right display 306R for the right eye and a left display 306L for the left eye. The left display 306L and the right display 306R may show the same image. In one embodiment, when the display is a three-dimensional display, the parallax for the three-dimensional may be shown on the two displays 306R and 306L. In one embodiment, the glass-type wearable device may include a camera. The image captured by the camera is sent to a camera image input module 312. The camera may capture a frontal view of the user wearing the glass-type wearable device 300. The image data is supplied to a window recognition module 307, a gesture recognition module 309, and an operation-recognition module 311. The processing circuitry of the window recognition module 307 may determine a virtual window based on the motion of the finger. The motion of the finger may be determined from the image captured by the camera. The position coordinates of the virtual window are determined by the processing circuitry of the window recognition module 307 based on the view direction determined by the view direction recognition module 304. The window start module 308 sets a virtual window to the position coordinates as determined by the window recognition module 307. The data of the virtual window are supplied to the display controller 305.

The operation recognition module 307 recognizes an operation from the motion of the finger of the user in the virtual window from the image captured by the camera. The operation data from the operation recognition module 307 are supplied to the operation control module 310. The gesture recognition module 310 recognizes the gesture in the virtual window from the image captured by the camera. The detected data of the gesture are supplied to the operation control module 310. The processing circuitry of the operation control module 310 sends the updates of the display based on the user's operation and gesture to the display controller 305.

Figure 19:
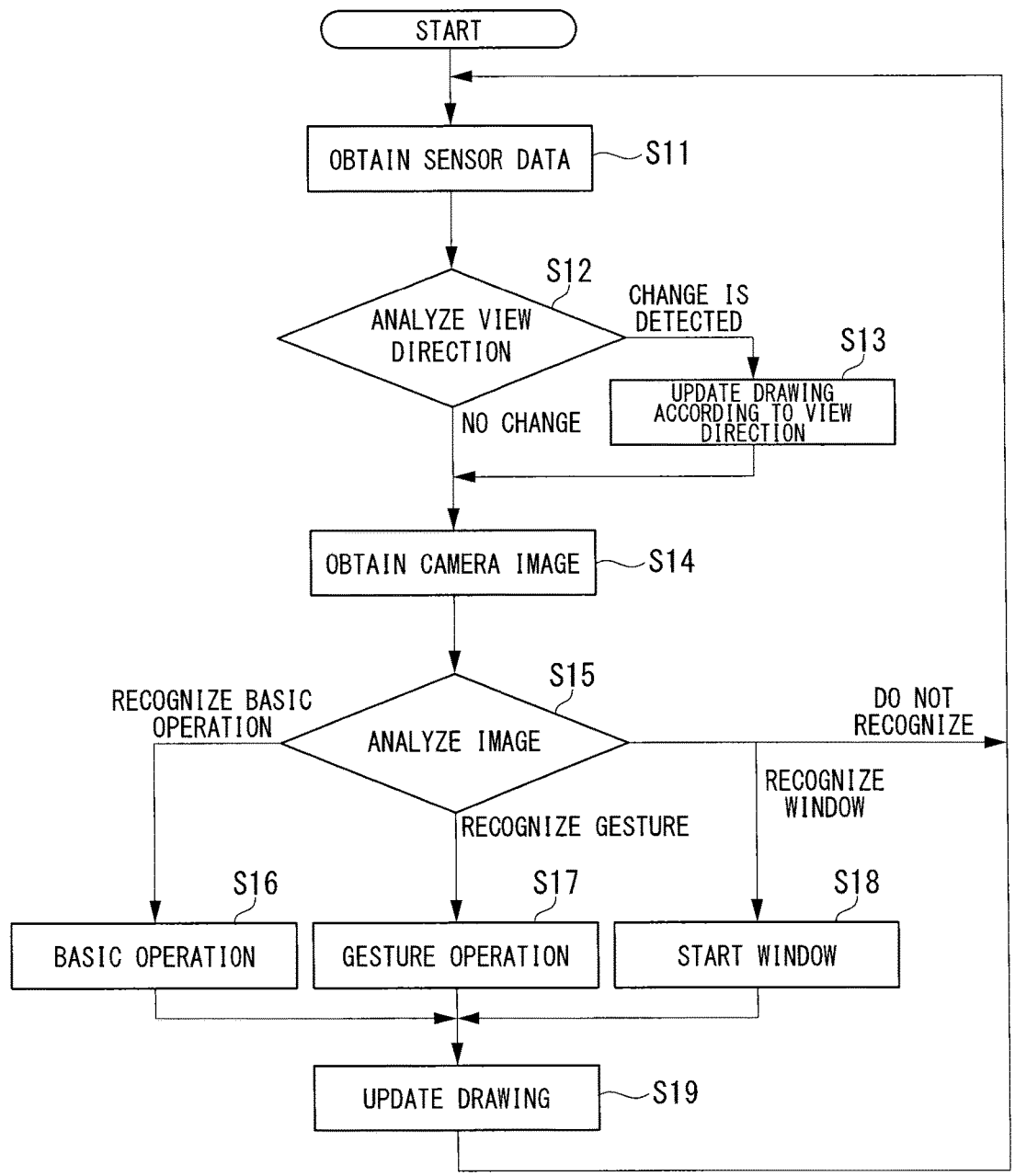
FIG. 19 is a flow chart that shows the operation of a glass-type wearable device according to certain embodiments.

FIG. 19 is a flow chart that shows the operation of a glass-type wearable device according to certain embodiments. At step S11, the view direction recognition module 304 acquires sensor data from the sensor input module 301. At step S12, the view direction recognition module 304 analyzes a view direction from the sensor data acquired at step S11, to determine whether the view direction has changed. At step S13, in response to determining that the view direction has changed, the direction recognition module 304 sends the change of the view direction to the display controller 305. The display controller 305 draws the image according to the view direction. Then the flow goes to step S14. At step S14, in response to determining that there is no change in the view direction, an image from the camera is obtained. The image is sent to the operation recognizing module 311, the gesture-recognizing module 309, and the window recognizing module 307. At step S16, the processing circuitry of each of the operation recognizing module 311, the gesture-recognizing module 309, and the window recognizing module 307, analyzes the image captured by the camera.

When the result of the analysis of step S15 is a basic operation, the operation recognition module 311 recognizes the basic operation, and sends the corresponding operation to the operation control module 310 at step S16. When the result of the analysis at step S15 is a gesture operation, the gesture recognition module 309 recognizes the gesture, and directs the corresponding operation to the operation control module 310 at step S17. When the result of the analysis at step S15 is a window creation operation, the window recognition module 307 recognizes the window creation operation, and directs creation of a window to the window activating module 308 at step S18. When the analysis at step S15 does not recognize an operation, the flow goes to step S11. At step S19, the display controller 305 updates the display 306 based on the recognition results of step S16, S17, and S18. Then the flow goes to S11.

Figure 20:
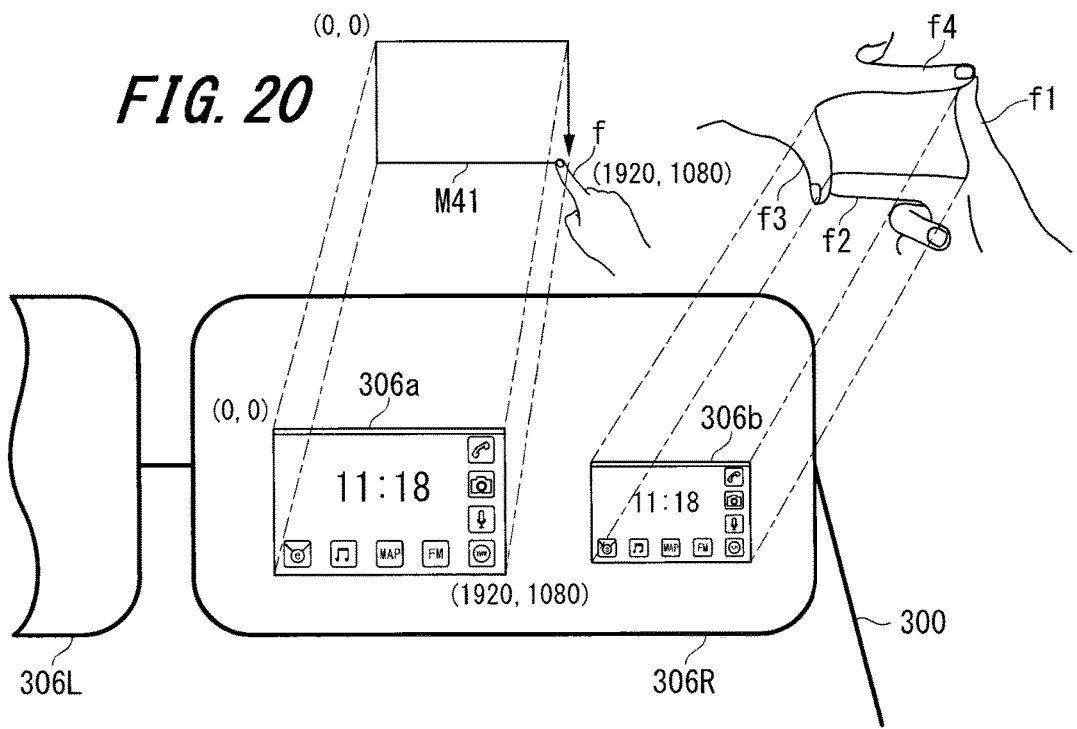
FIG. 20 is an exemplary illustration of setting a virtual window according to certain embodiments.

FIG. 20 is an exemplary illustration of setting a virtual window according to certain embodiments. In FIGS. 20-23 the right display 306R is shown and the left display 306L is omitted. In one embodiment, the left display 306L and the right display 306R shows the same image. The user may move the finger f in the visual field of the display 306. The glass-type wearable device 300 sets a virtual window based on the motion M41. The window 306a is shown on the display 306. In one embodiment, a user may set the virtual window by forming a square using four fingers f1, f2, f3, and f4 in the visual field of the display 306. The glass-type wearable device 300 sets the virtual window to the coordinates' position indicated by the fingers f1, f2, f3, and f4. Then, the window 306b is shown on the display 306. The image inside each of the windows 306a and 306b shown on the display 306 is controlled by gestures performed with the finger of the user in each corresponding virtual window. The virtual window overlaps with the windows 306a and 306b.

Figure 21:
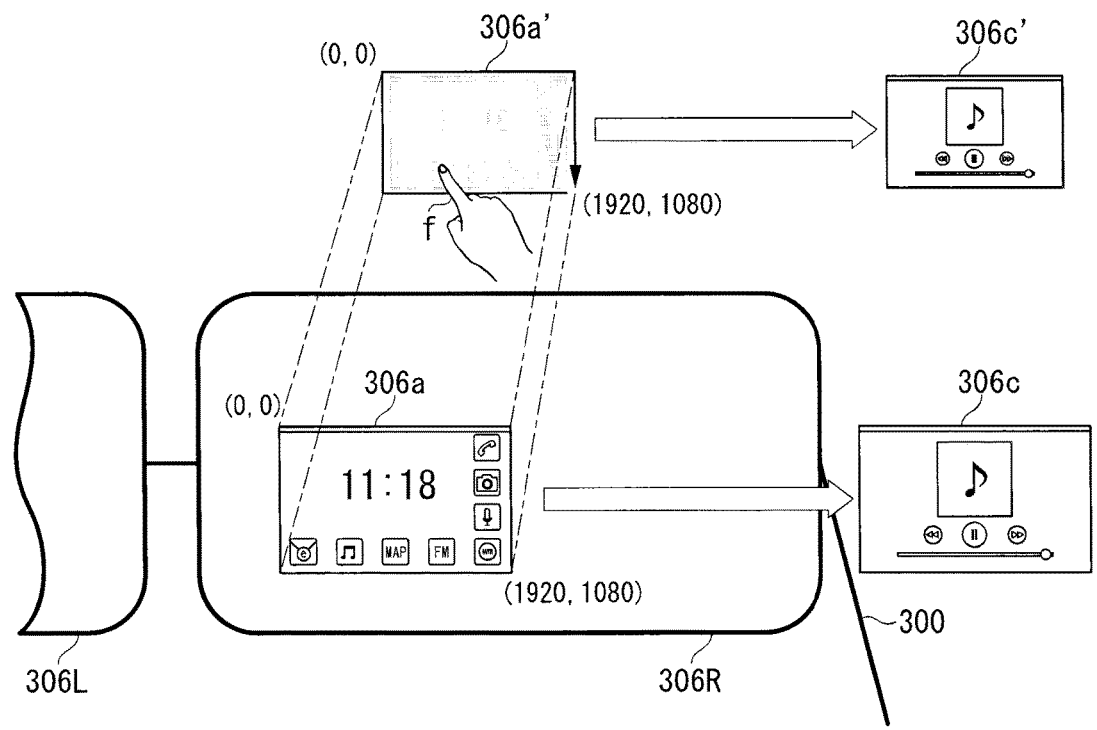
FIG. 21 is an exemplary illustration of selecting an icon according to certain embodiments.

FIG. 21 is an exemplary illustration of selecting an icon according to certain embodiments. When the user taps on an icon in a virtual window 306a' that corresponds with the window 306a, the glass-type wearable device 300 starts the application program of the selected icon. The display 306 shows the windows 306c which corresponds to the execution screen of the application program. The window 306c can be operated by touch of the virtual window 306c'. The virtual window 306c' has the same coordinates as the virtual window 306a'.

FIG. 22 is an exemplary illustration of setting multiple virtual windows according to certain embodiments. The user wearing the glass-type wearable device 300 may perform a motion HM1 by rotating his head horizontally. The user may perform a motion M51 which draws a first virtual window with the finger f in a first view direction. The glass-type wearable device 300 sets the virtual window corresponding to the motion M51. A first window 306d is shown on the display in the position that corresponds with the first virtual window. Next, the user performs the motion HM1 which moves the head to a horizontal direction. The user may perform a motion M52 with the finger f2 which draws a second virtual window. The glass-type wearable device 300 sets the second virtual window that corresponds to the motion M52. A second window 306e which corresponds with the second virtual window is shown on the display. The user may switch from the first window 306d to the second window 306e by a head movement. That is, when the user faces the left side, the first window 306d is shown. When the user faces the right side, the second window 306e is shown.

FIGS. 23A, 23B, 23C, and 23D are exemplary illustrations of several virtual windows according to certain embodiments. FIG. 23 shows the example in which several virtual windows are set in order on space, by a user's operation.

Figure 23A:
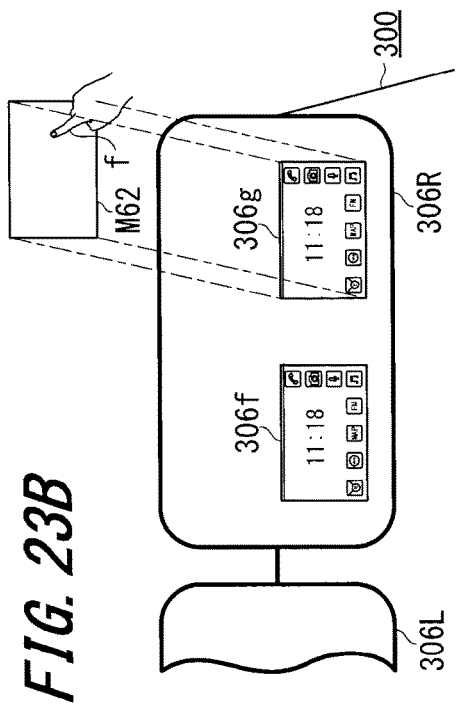
FIG. 23A is an exemplary illustration of several virtual windows according to certain embodiments.
Figure 23B:
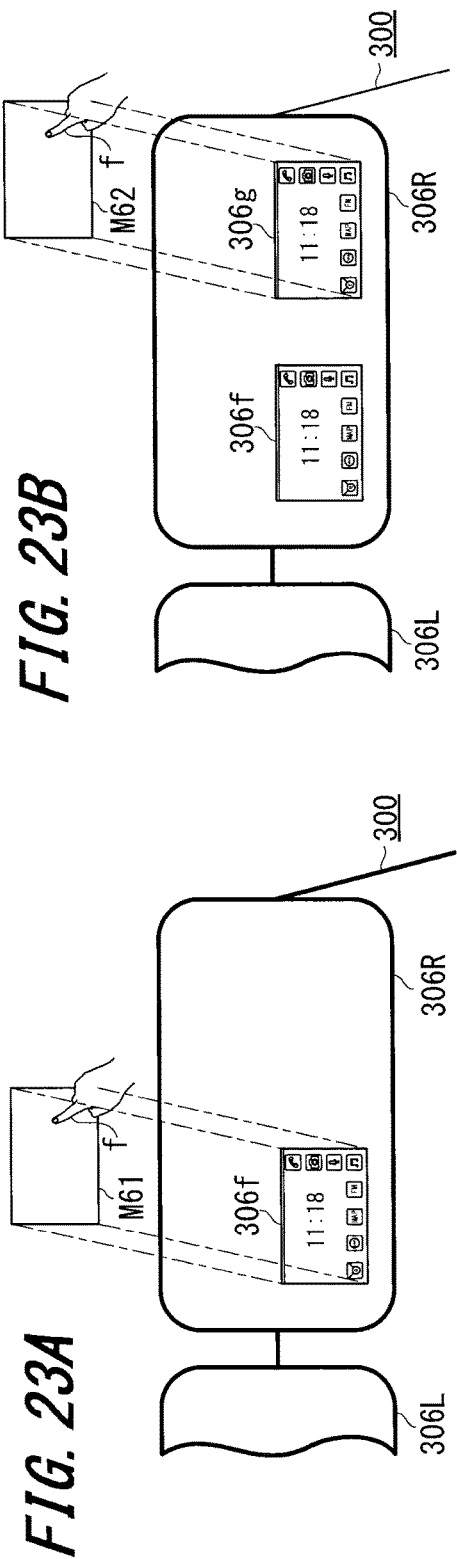
FIG. 23B is an exemplary illustration of several virtual windows according to certain embodiments.
Figure 23D:
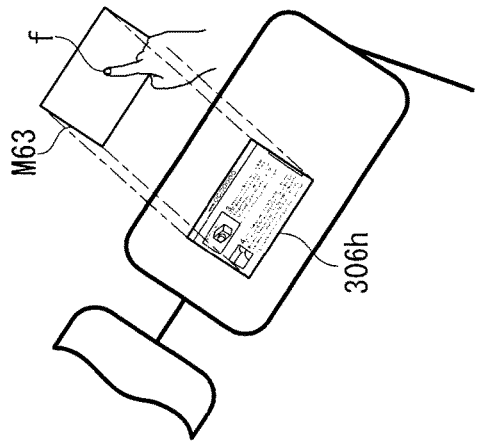
FIG. 23D is an exemplary illustration of several virtual windows according to certain embodiments.
Figure 23C:
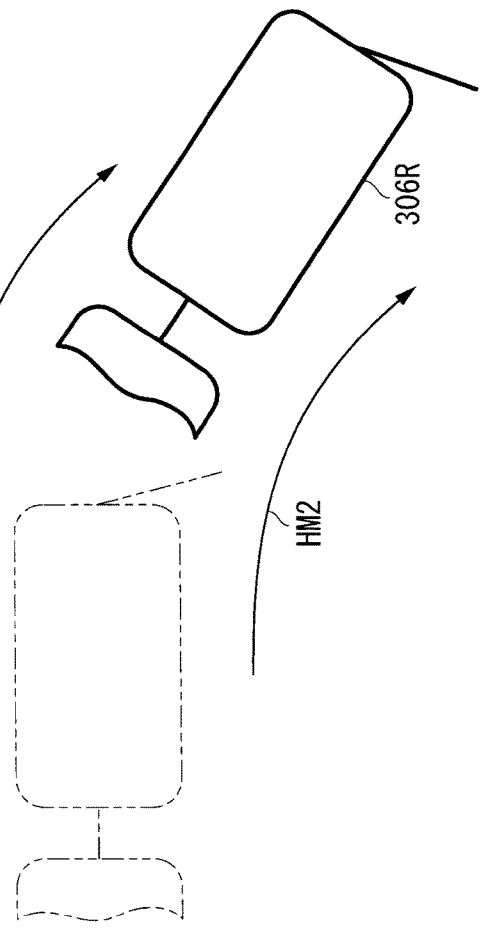
FIG. 23C is an exemplary illustration of several virtual windows according to certain embodiments.

FIG. 23A shows a user setting a virtual window by the motion M61 in a first view direction. The window 306f is shown on the display 306. In FIG. 23B, the user may set a second virtual window in the first view direction by a motion M62 of the finger f. The window 306g is shown on the display 306. The window 306g is shown on the same screen as the first window 306f. Next, the user may perform a motion HM2 which changes the visual field as shown in FIG. 23C. When the field of view is changed, the windows 306f and 306g are no longer shown on the display 306. The user may set a new virtual window by performing a motion M63 as shown in FIG. 23D. The setting of the new virtual window results in showing window 306h on the display. Thus, the glass-type wearable device 300 can set separate virtual windows in a plurality of field of views. The execution screen of each application may be shown in its respective virtual window. Therefore, the glass-type wearable device 300 may show multiscreen.

Aspects of this disclosure are directed to a wearable device 100 worn by a user that determines gestures performed by the user to create virtual windows. In certain embodiments, other types of terminal devices, such as glass type device or other devices configured to detect a motion by the user finger or hand may be used. In addition, the wearable device 100 may communicate with any device that includes a display. A projector may be used as a display.

Operations that may be performed using the virtual window are not limited to the operations described herein. The user may perform various operations associated with a touchscreen such as tapping, flicking, tapping, pulling, scrolling, double tapping, and zooming.

In certain embodiments, the user may indicate the beginning and the end of the creation of the virtual window by pushing a button. Other methods may be used to indicate the beginning and the end of the creation of the virtual window. For example, voice recognition techniques may be used by matching a sentence to a command. The user may use "window creation start" for example to indicate the beginning of the creation of the virtual window. The user may use "window creation end" to indicate the end of the creation. In certain embodiments, predetermined gestures may be used to indicate the beginning and the end of the creation of the virtual window.

Obviously, numerous modifications and variations of the present disclosure are possible in light of the above teachings. It is therefore to be understood that within the scope of the appended claims, the invention may be practiced otherwise than as specifically described herein. For example, advantageous results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable processing circuits configured to execute program code and/or computer instructions to execute the functions, processes and algorithms described herein. A processing circuit includes a programmed processor, as a processor includes circuitry. A processing circuit also includes devices such as an application specific integrated circuit (ASIC) and conventional circuit components arranged to perform the recited functions.

The functions and features described herein may also be executed by various distributed components of a system. For example, one or more processors may execute these system functions, wherein the processors are distributed across multiple components communicating in a network. The distributed components may include one or more client and/or server machines, in addition to various human interface and/or communication devices (e.g., display monitors, smart phones, tablets, personal digital assistants (PDAs)). The network may be a private network, such as a LAN or WAN, or may be a public network, such as the Internet. Input to the system may be received via direct user input and/or received remotely either in real-time or as a batch process. Additionally, some implementations may be performed on modules or hardware not identical to those described. Accordingly, other implementations are within the scope that may be claimed.

The above disclosure also encompasses the embodiments noted below.

(1) A system including: circuitry configured to acquire detection data from at least one sensor corresponding to a motion of a finger of a user; set a window in a space based on the detection data; identify a gesture based on a second motion of the finger of the user in the window; and output a command controlling a display content based on the gesture.

(2) The system of (1), wherein the circuitry is further configured to: match the gesture with a corresponding touch panel gesture; and update the display content to predefined contents of the corresponding touch panel gesture.

(3) The system of (1) or (2), wherein the display includes a plurality of areas and the display content of each of the plurality of areas is set based on detected data in a corresponding window in space.

(4) The system of any one of (1) to (3), wherein a single motion is needed to set the window.

(5) The system of (4), wherein the window is set based on the single motion and a predetermined aspect ratio.

(6) The system of any one of (1) to (5), wherein the window is set based on a first motion in the horizontal direction and a second motion in the vertical direction.

(7) The system of any one of (1) to (6), wherein the window is set based on a shape formed by fingers of the user.

(8) The system of any one of (1) to (7), wherein the motion is detected from an image acquired by a camera.

(9) The system of any one of (1) to (8), wherein the circuitry is further configured to set a plurality of windows based on a plurality of motions received from a plurality of users.

(10) The system of any one of (1) to (9), wherein the circuitry is further configured to: detect a first view direction; set a first window based on the finger motion in the first view direction; detect a second view direction; and set a second window based on the finger motion in the second view direction.

(11) The system of any one of (1) to (10), wherein the circuitry is further configured to: detect a head movement; and switch from the first window to the second window based on the head movement.

(12) The system of any one of (1) to (11), wherein the size of an icon is a function of the size of the window.

(13) The system of any one of (1) to (12), wherein the circuitry is further configured to: detect a first input from the user indicating the start of the creation of the window; and detect a second input from the user indicating the end of the creation of the window.

(14) The system of any one of (1) to (13), wherein the circuitry is included in a wearable device, and the system further comprises a device including a display configured to receive the command output by the circuitry of the wearable device.

(15) A method for controlling a display, including: acquiring, using processing circuitry, detection data from at least one sensor corresponding to a motion of a finger of a user in space; setting, using the processing circuitry, a window based on the detection data; identifying, using the processing circuitry, a gesture of the user based on a second motion of the finger of the user detected in the window; and outputting, using the processing circuitry, a command controlling a display content based on the gesture.

(16) A non-transitory computer readable medium storing computer-readable instructions therein which when executed by a computer causes the computer to perform a method for controlling a display, the method including: acquiring detection data from at least one sensor corresponding to a motion of a finger of a user in space; setting a window based on the detection data; identifying a gesture of the user based on a second motion of the finger of the user detected in the window; and outputting a command controlling a display content based on the gesture.

The invention claimed is:

1. A system comprising:
a wearable device including circuitry, the circuitry of the wearable device configured to
detect a first input indicating a start of creation of a window,
acquire detection data from at least one sensor associated with the wearable device corresponding to a first motion of a finger of a user,
transmit the detection data to an electronic device, and
detect a second input indicating an end of the creation of the window; and
the electronic device including circuitry, the circuitry of the electronic device configured to
create the window to correspond to a portion of a display of the electronic device based on the detection data acquired between the first input and the second input, the window having a size determined by the detection data acquired between the first input and the second input, the portion of the display including a displayed icon,
identify a gesture based on sensed data outputted by the wearable device in response to a second motion of the finger of the user, and
control a display content of the display of the electronic device when the gesture is detected to be within a region of the window associated with the displayed icon, a size of the region of the window being a function of the size of the window.

2. The system of claim 1, wherein the circuitry of the electronic device is further configured to:
match the gesture with a corresponding touch panel gesture; and
update the display content to predefined contents of the corresponding touch panel gesture.

3. The system of claim 1, wherein the display includes a plurality of areas and the display content of each of the plurality of areas is set based on detected data in a corresponding window in space.

4. The system of claim 1, wherein the window is set based on a single detected motion in the detection data.

5. The system of claim 4, wherein the window is set based on the single motion and a predetermined aspect ratio.

6. The system of claim 1, wherein the window is set based on a first motion in a horizontal direction and a second motion in a vertical direction.

7. The system of claim 1, wherein a shape of the window is set based on a shape formed by fingers of the user.

8. The system of claim 1, wherein the first motion is detected from an image acquired by a camera.

9. The system of claim 1, wherein the circuitry of the electronic device is further configured to set a plurality of windows based on a plurality of motions received from a plurality of users.

10. The system of claim 1, wherein the circuitry of the electronic device is further configured to:
detect a first view direction;
set a first window based on the first motion of the finger in the first view direction;
detect a second view direction; and
set a second window based on the first motion of the finger in the second view direction.

11. The system of claim 10, wherein the circuitry of the electronic device is further configured to:
detect a head movement; and
switch from the first window to the second window based on the head movement.

12. The system of claim 1, wherein a size of an icon is a function of a size of the window.

13. The system of claim 1, wherein the first input is a press of a button of the wearable device.

14. The system of claim 1, wherein the circuitry of the wearable device is further configured to detect an acceleration to the wearable device;
the circuitry of the electronic device is further configured to
determine a distance corresponding to the motion of the finger of the user based on the acceleration data; and
wherein dimensions of the window are a function of the distance.

15. The system of claim 1, wherein a number of icons displayed on the display is a function of dimensions of the window.

16. The system of claim 1, wherein the circuitry of the electronic device is further configured to:
create a second window in a second portion of the display based on data received from a second wearable device; and
control the second portion of the display based on data detected in the second window, the data being associated with a second gesture detected by the second wearable device.

17. A method for controlling a display, the method comprising:
detecting, using processing circuitry of a wearable device, a first input indicating a start of creation of a window;
acquiring, using the processing circuitry of the wearable device, detection data from at least one sensor associated with the wearable device corresponding to a first motion of a finger of a user;
transmitting, using the processing circuitry of the wearable device, the detection data to an electronic device;
detecting, using the processing circuitry of the wearable device, a second input indicating an end of the creation of the window;
creating, using processing circuitry of the electronic device, the window to correspond to a portion of a display of the electronic device based on the detection data acquired between the first input and the second input, the window having a size determined by the detection data acquired between the first input and the second input, the portion of the display including a displayed icon;
identifying, using the processing circuitry of the electronic device, a gesture based on sensed data outputted by the wearable device in response to a second motion of the finger of the user; and
controlling a display content of the display of the electronic device when the gesture is detected to be within a region of the window associated with the displayed icon, a size of the region of the window being a function of the size of the window.

18. A non-transitory computer readable medium storing computer-readable instructions therein which when executed by a computer causes the computer to perform a method for controlling a display, the method comprising:
detecting a first input from a wearable device indicating a start of creation of a window;
acquiring detection data from at least one sensor associated with the wearable device corresponding to a first motion of a finger of a user in space;
transmitting the detection data to an electronic device;
detecting a second input from the wearable device indicating an end of the creation of the window;
creating the window to correspond to a portion of a display of the electronic device based on the detection data acquired between the first input and the second input, the window having a size determined by the detection data acquired between the first input and the second input, the portion of the display including a displayed icon;
identifying a gesture of the user based on sensed data outputted by the wearable device in response to a second motion of the finger of the user; and
controlling a display content of the display of the electronic device when the gesture is detected to be within a region of the window associated with the displayed icon, a size of the region of the window being a function of the size of the window.

* * * * *